(12) United States Patent
van de Grampel et al.

(10) Patent No.: US 7,700,696 B2
(45) Date of Patent: Apr. 20, 2010

(54) POLYCARBONATE COMPOSITION HAVING IMPROVED SCRATCH RESISTANCE, AND ARTICLES FORMED THEREFROM

(75) Inventors: Robert Dirk van de Grampel, Tholen (NL); Jan-Pleun Lens, Breda (NL); Dake Shen, Shanghai (CN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 897 days.

(21) Appl. No.: 11/427,102

(22) Filed: Jun. 28, 2006

(65) Prior Publication Data

US 2008/0004404 A1    Jan. 3, 2008

(51) Int. Cl.
   *C08L 69/00* (2006.01)
(52) U.S. Cl. ............... 525/439; 525/462; 525/469
(58) Field of Classification Search .............. None
   See application file for complete search history.

(56) References Cited

U.S. PATENT DOCUMENTS

| | | | | |
|---|---|---|---|---|
| 4,304,899 A | * | 12/1981 | Mark et al. | 528/171 |
| 4,436,879 A | * | 3/1984 | Miller et al. | 525/439 |
| 4,469,850 A | * | 9/1984 | Belfoure et al. | 525/439 |
| 4,746,711 A | * | 5/1988 | Serini et al. | 525/439 |
| 4,900,785 A | | 2/1990 | Leitz et al. | |
| 4,918,149 A | | 4/1990 | Clagett et al. | |
| 5,034,457 A | * | 7/1991 | Serini et al. | 525/67 |
| 6,265,522 B1 | | 7/2001 | Brunelle et al. | |
| 6,294,647 B1 | | 9/2001 | Brunelle et al. | |
| 6,538,065 B1 | | 3/2003 | Suriano et al. | |
| 6,559,270 B1 | | 5/2003 | Siclovan et al. | |
| 6,861,482 B2 | | 3/2005 | Brunelle et al. | |

FOREIGN PATENT DOCUMENTS

| | | |
|---|---|---|
| EP | 0135679 | 4/1985 |
| WO | 2005055236 | 6/2005 |

OTHER PUBLICATIONS

International Search Report for International Application No. PCT/US2007/069350, Mailed Jan. 30, 2008, 6 pages.
Written Opinion for International Application No. PCT/US2007/069350, Mailed Jan. 30, 2008, 6 pages.
ASTM D 2457-03, "Standard Test Method for Specular Gloss of Plastic Films and Solid Plastics", 5 pages.
ASTM D 3363-92a, "Standard Test Method for Film Hardness by Pencil Test", 2 pages.
ISO 4892-2, "Plastics-Methods of exposure to laboratory light sources-Part2: Xennon-arc lamps", 14 pages.

* cited by examiner

*Primary Examiner*—David Buttner

(57) ABSTRACT

A thermoplastic composition comprises A) 25 to 95 parts by weight of a first polycarbonate consisting essentially of i) 25 to 100 mole percent of a first carbonate unit comprising an alkyl-substituted bisphenol carbonate unit, ii) 0 to 75 mole percent of a second carbonate unit where the first and second carbonate units are not identical, and the sum of the mole percentages of the first and second carbonate units in the first polycarbonate is 100 mole percent; B) 5 to 75 parts by weight of a polyester-polycarbonate where the molar ratio of carbonate unit to arylate ester unit is 95:5 to 10:90; and C) 0 to 65 parts by weight of a second polycarbonate, where the first polycarbonate and second polycarbonate are not identical, and the sum of the parts by weight of the first polycarbonate, the polyester-polycarbonate, and the second polycarbonate is 100 parts by weight.

18 Claims, 1 Drawing Sheet

Gloss retention as F(%ester)

◆ Gloss ret%
— Gloss ret. predicted

Scratch depth as F(%DMBPC)

◆ Scratch depth
— Scratch predicted

POLYCARBONATE COMPOSITION HAVING IMPROVED SCRATCH RESISTANCE, AND ARTICLES FORMED THEREFROM

BACKGROUND OF THE INVENTION

This disclosure relates to thermoplastic compositions having improved scratch resistance, methods of manufacture, and articles prepared from the thermoplastic composition.

Lightweight thermoplastic materials that have a glossy or semi-gloss finished appearance are useful materials of construction for all or part of durable articles, such as molded or thermoformed articles ranging from hand-held electronics devices such as cell phones to exterior components of automobiles. Polycarbonate-based materials, with their high surface gloss capability, high transparency, and excellent impact strength, are highly useful for such applications. Stabilized, weatherable polycarbonate compositions can be of use for applications in which the article may be exposed to outdoors conditions of light and moisture. The use of weatherable polycarbonates can also provide color stability and surface finish properties that may be desirable in the articles, particularly those for use in the outdoors. Weatherable thermoplastic compositions, however, may have lower ductility and decreased processability, in addition to a higher manufacturing cost, and can therefore be less desirable for use in some applications where high ductility and thermoformability are useful.

Durability and abrasion resistance are also useful properties for a lightweight thermoplastic, for applications in which the exterior surface of the article may be subject to physical contact by other objects. For such applications, articles that are prepared from polymers such as polycarbonates are expected to withstand abrasion, e.g., when exposed to abrasive materials such as steel wool and cleaning agents, sliding on a surface, dropping, slipping it inside a pocket, rubbing against other items such as coins, keys, or the like. Polymer compositions with scratch resistance are therefore desirable in articles requiring a durable surface finish and appearance.

Accordingly, there remains a need in the art for a polycarbonate-based thermoplastic that has both excellent gloss retention and improved scratch resistance. The thermoplastic composition should also have other physical properties, such as weatherability, impact strength, ductility, and thermal flow characteristics for manufacturability by injection molding, extruding, and/or thermoforming that are comparable to or better than existing polycarbonate-based thermoplastic compositions.

SUMMARY OF THE INVENTION

The above deficiencies in the art are alleviated by, in an embodiment, a thermoplastic composition comprising A) 25 to 95 parts by weight of a first polycarbonate consisting essentially of i) 25 to 100 mole percent of a first carbonate unit having the formula:

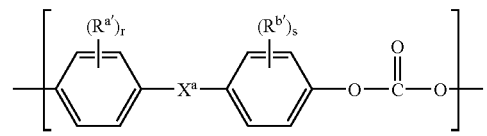

wherein $R^{a'}$ and $R^{b'}$ are each independently $C_{1-12}$ alkyl, $X^a$ is a $C_{1-18}$ alkylidene bridging group, a $C_{3-18}$ cycloalkylidene bridging group, or a $C_{9-18}$ fused cycloalkylidene-aromatic bridging group, and r and s are each independently 1 to 4, and ii) 0 to 75 mole percent of a second carbonate unit having the formula:

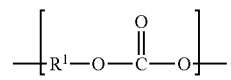

wherein each $R^1$ is a $C_{6-30}$ aromatic group, the first carbonate unit and second carbonate unit are not identical, and the sum of the mole percentages of the first carbonate unit and second carbonate unit in the first polycarbonate is 100 mole percent; B) 5 to 75 parts by weight of a polyester-polycarbonate having the formula:

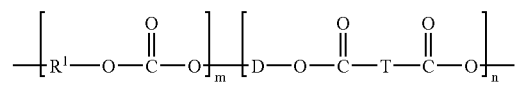

wherein $R^1$, D, and T are each independently a $C_{6-30}$ aromatic group, and the molar ratio of m to n is 95:5 to 10:90, and C) 0 to 65 parts by weight of a second polycarbonate, and D) an additive, wherein the first polycarbonate and second polycarbonate are not identical, and the sum of the parts by weight of the first polycarbonate, the polyester-polycarbonate, and the second polycarbonate is 100 parts by weight.

In another embodiment, a thermoplastic composition comprises A) 25 to 95 parts by weight of a first polycarbonate comprising the formula:

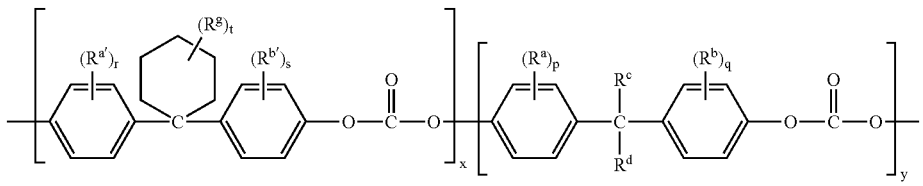

wherein $R^a$, $R^b$ and $R^g$ are each independently $C_{1-12}$ alkyl or halogen; $R^{a'}$ and $R^{b'}$ are each independently $C_{1-12}$ alkyl, and at least one of each of $R^{a'}$ and $R^{b'}$ is disposed meta to the cyclohexylidene bridge; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; r and s are independently 1 to 4, p and q, are independently 0 to 4, t is 0 to 10, and the molar ratio of x to y is 25:75 to 100:0, and B) 5 to 75 parts by weight of a polyester-polycarbonate comprising the formula:

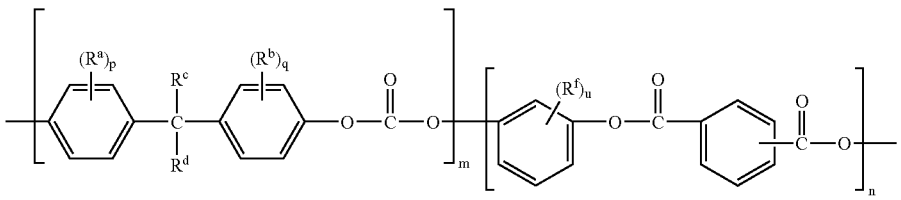

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; p, q, and u are independently 0 to 4, and the molar ratio of m to n is 95:5 to 10:90, and C) 0 to 65 parts by weight of a second polycarbonate, wherein the first polycarbonate and second polycarbonate are not identical, and the sum of the parts by weight of the first polycarbonate, the polyester-polycarbonate, and the second polycarbonate is 100 parts by weight.

In another embodiment, an article comprising the thermoplastic composition is disclosed.

A description of the figures, which are meant to be exemplary and not limiting, is provided below.

Figure 1:
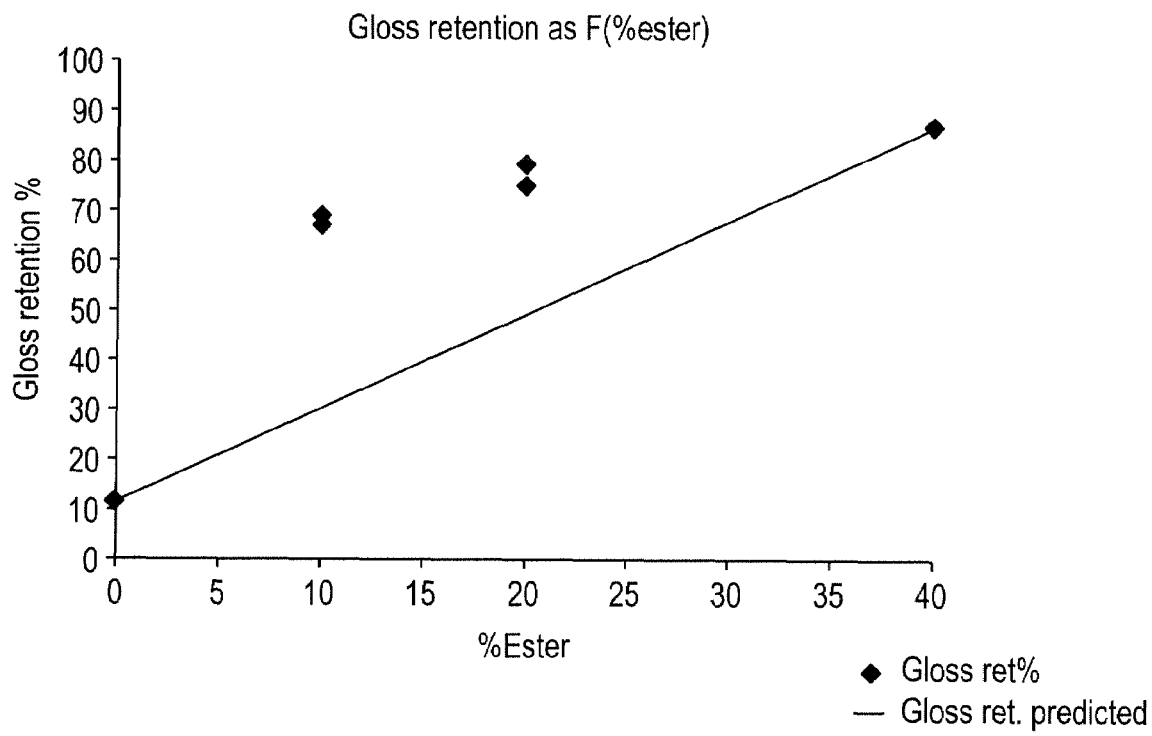
FIG. 1 is a plot of percent gloss retention versus percent ITR ester for the thermoplastic composition of the examples and comparative examples.

The above described and other features are exemplified by the following detailed description.

DETAILED DESCRIPTION OF THE INVENTION

Surprisingly, it has been found that a thermoplastic composition comprising a combination of a polycarbonate comprising alkyl-substituted bisphenol carbonate units with a polyester-polycarbonate comprising weatherable arylate ester units, provides a synergistically high gloss retention of greater than or equal to 50% after weathering according to ISO 4892-2A using a xenon arc lamp, and as measured according to ASTM D2457-03. Specifically useful arylate ester units are isophthalate-terephthalate-resorcinol ester (ITR) units. Thermoplastic compositions that include a colorant are specifically useful. In an embodiment, an article comprising the thermoplastic composition has a black color. The gloss retention upon weathering for the thermoplastic composition is unexpectedly and desirably higher than that calculated from the additive values of gloss retention for the alkyl-substituted bisphenol polycarbonate component and the polyester-polycarbonate that would be expected for the corresponding additive weight fractions of these polymers. The combination further unexpectedly improves the scratch resistance of the thermoplastic composition, in which the pencil scratch test for the weathered thermoplastic composition shows a hardness of HB or harder according to ASTM D3363-92a, and the Erichson scratch test performed using a needle held at an angle of 90 degrees relative to the surface being tested results in a scratch depth of less than 19 micrometers under a downward force of 6 Newtons. Thus, the combination of alkyl-substituted bisphenol carbonate units and arylate ester units unexpectedly provides a combination of synergistic values for both gloss retention and scratch resistance in which the combination of these values is improved over the expected combined values for the separate component polymers.

As used herein, the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkylene" refers to a non-aromatic alicyclic divalent hydrocarbon group having at least three carbon atoms; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups may be unsubstituted or substituted, provided that the substitution does not significantly adversely affect synthesis, stability, or use of the compound. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Also as used herein, the term "combination" is inclusive of blends, mixtures, alloys, reaction products, and the like. Combinations of substituents and/or variables are permissible provided that the substitutions do not significantly adversely affect synthesis or use of the compound.

The thermoplastic composition disclosed herein comprises a polycarbonate. As used herein, the terms "polycarbonate" and "polycarbonate block" mean a composition having repeating structural carbonate units of the formula (1):

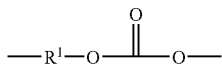

(1)

in which greater than or equal to 60 percent of the total number of $R^1$ groups are aromatic organic groups and the balance thereof are aliphatic, alicyclic, or aromatic groups. In an embodiment, each $R^1$ is a $C_{6-30}$ aromatic group. In another embodiment, each $R^1$ is of the formula -$A^1$-$Y^1$-$A^2$- wherein each of $A^1$ and $A^2$ is a monocyclic divalent aromatic group and $Y^1$ is a bridging group having one or more atoms that separate $A^1$ from $A^2$. In an exemplary embodiment, one atom separates $A^1$ from $A^2$. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentylidene, cyclododecylidene, and adamantylidene. The bridging group $Y^1$ may be a hydrocarbon group or a saturated hydrocarbon group such as methylene, cyclohexylidene, or isopropylidene. In another embodiment, $Y^1$ is a carbon-carbon bond (—) connecting $A^1$ and $A^2$.

Polycarbonates may be produced by the interfacial reaction of dihydroxy aromatic compounds having the formula HO—$R^1$—OH (where $R^1$ is as defined for formula (1)), which includes dihydroxy aromatic compounds of formula (2), also referred to herein as a bisphenol:

HO-$A^1$-$Y^1$-$A^2$-OH     (2)

wherein $Y^1$, $A^1$ and $A^2$ are as described above. Included are bisphenol compounds comprising two hydroxy-substituted $C_6$ arylene groups connected by a bridging group as shown in general formula (4):

(3)

wherein $R^a$ and $R^b$ each represent a halogen or $C_{1-12}$ alkyl group and may be the same or different; p and q are each independently integers of 0 to 4. It will be understood that $R^a$ is hydrogen when p is 0, and likewise $R^b$ is hydrogen when q is 0. Also in formula (3), $X^a$ represents a bridging group connecting the two hydroxy-substituted aromatic groups (i.e., hydroxy-substituted $C_6$ arylene groups such as, for example, phenol or o-cresol), where the bridging group and the hydroxy substituent of the $C_6$ arylene group are disposed para to each other on the $C_6$ arylene group. In an embodiment, the bridging group $X^a$ is a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group.

In an embodiment, $X^a$ is one of the groups of formula (4):

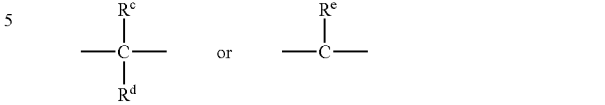

(4)

wherein $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

In still another embodiment, $X^a$ is an acyclic $C_{1-18}$ alkylidene group, a $C_{3-18}$ cycloalkylidene group, or a $C_{2-18}$ heterocycloalkylidene group, i.e., a cycloalkylidene group having up to three heteroatoms in the ring, wherein the heteroatoms include —O—, —S—, or —N(Z)-, where Z is hydrogen, halogen, hydroxy, $C_{1-12}$ alkyl, $C_{1-12}$ alkoxy, or $C_{1-12}$ acyl.

In another embodiment, $X^a$ is a substituted $C_{3-18}$ cycloalkylidene of the formula (5):

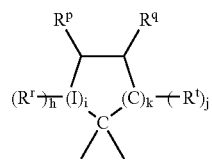

(5)

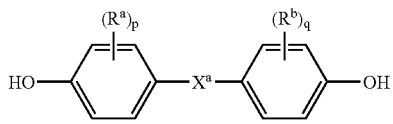

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)- where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

Some illustrative, non-limiting examples of dihydroxy aromatic compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4- hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (2) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), 9,9-bis(4-hydroxyphenyl)fluorene, and 1,1-bis(4-hydroxy-3-methylphenyl)cyclohexane ("DMBPC"). Combinations comprising at least one of the foregoing dihydroxy aromatic compounds may also be used.

Another dihydroxy aromatic group $R^1$ is derived from a dihydroxy aromatic compound of formula (6):

(6)

wherein each $R^f$ is independently $C_{1-12}$ alkyl, or halogen, and u is 0 to 4. It will be understood that $R^f$ is hydrogen when u is 0. Typically, the halogen can be chlorine or bromine. In an embodiment, compounds of formula (6) in which the —OH groups are substituted meta to one another, and wherein $R^f$ and u are as described above, are also generally referred to herein as resorcinols. Examples of compounds that may be represented by the formula (6) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

In an embodiment, useful polycarbonates can be derived from dihydroxy aromatic compounds of formula (2). In a specific embodiment, polycarbonates comprise a combination of carbonate units derived from dihydroxy aromatic compounds of formula (3), formula (6), or a combination comprising at least one of the foregoing dihydroxy aromatic compounds.

In an embodiment, polycarbonates useful herein are homopolymers or copolymers derived from bisphenols having alkyl substituents on each of the $C_6$ arylene groups of the bisphenol in addition to a hydroxy group and bridging group. Such bisphenols are represented by general formula (3), where p and q are each 1 to 4, $R^a$ and $R^b$ are each independently $C_{1-12}$ alkyl groups, and $X^a$ is as described for formula (5). In a specific embodiment, at least one of each of $R^c$ or $R^b$ is disposed meta to $X^a$. In another specific embodiment, useful alkyl-substituted bisphenols have a bridging group $X^a$ as described in formula (4), wherein $R^c$, $R^d$, and $R^e$ are as described as above. Exemplary acyclic alkylidene bridging groups include 2,2-propylidene, also referred to as isopropylidene, 2,2-hexylidene, 2,2-octylidene. In another embodiment, $X^a$ is a $C_{3-18}$ cycloalkylidene bridging group, particularly cyclopentylidene or a group of formula (5), for example a fused bis-aromatic cyclopentylidene derived from 9-fluorenone, cyclohexylidene, 2,2-adamantylidene, and the like.

Specific cycloalkylidene-bridged, alkyl-substituted bisphenols those of formula (7):

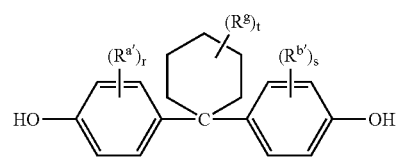

(7)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. It will be understood that when r, s, and/or t is 0, the corresponding valencies will be filled by hydrogen. In a specific embodiment, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In a specific embodiment, $R^{a'}$, $R^{b'}$ and $R^g$ are each methyl, r and s are each 1, and t is 0 or 3. In an exemplary embodiment, the cyclohexylidene-bridged bisphenol is the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one).

Polycarbonates as disclosed herein include polycarbonate homopolymers (also referred to herein as "homopolycarbonates"), and copolymers comprising different $R^1$ moieties in the carbonate unit and referred to herein as "copolycarbonates". Copolycarbonates as disclosed herein can comprise polycarbonate blocks of identical or specifically grouped carbonate repeating units, alternating sequences of different carbonate units, random sequences of different carbonate units, or a combination of these structural arrangements of different carbonate units. Where blocks are used, the block length may generally be 2 to 1,000 repeating units.

In an embodiment, the polycarbonate is an alkyl-substituted polycarbonate comprising alkyl-substituted bisphenol carbonate units of formula (8):

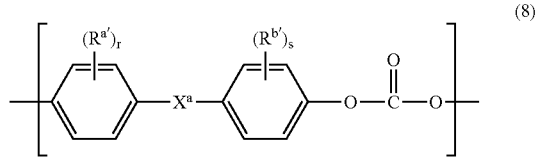

(8)

wherein $R^{a'}$ and $R^{b'}$ are each independently $C_{1-12}$ alkyl, $X^a$ is as described for formula (4) above, and r and s are each independently 1 to 4. In a specific embodiment, at least one of each of $R^{a'}$ and $R^{b'}$ is disposed meta to $X^a$. In another specific embodiment, $X^a$ is a $C_{1-18}$ alkylidene bridging group, $C_{3-18}$ cycloalkylidene bridging group, or $C_{9-18}$ fused cycloalkylidene-aromatic bridging group. The alkyl-substituted polycarbonate can be a homopolycarbonate or copolycarbonate comprising two or more non-identical types of carbonate unit. In an embodiment, a copolymer comprises alkyl substituted bisphenol carbonate units of formula (8), and carbonate units of formula (1), provided that the carbonate units of formula (1) are not identical to the alkyl-substituted bisphenol units of formula (8).

In a specific embodiment, the alkyl-substituted polycarbonates are derived from dihydroxy aromatic compounds of formula (7), above, to provide alkyl-substituted cyclohexylidene-bridged carbonate units of formula (9):

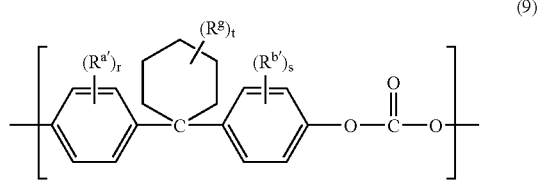

(9)

wherein $R^{a'}$, $R^{b'}$, $R^g$, and r, s, and t are as defined for formula (7). In another specific embodiment, at least one each of $R^{a'}$ and $R^{b'}$ is disposed meta to the cyclohexylidene bridge. In another specific embodiment, where the alkyl-substituted polycarbonate is a copolycarbonate, alkyl-substituted cyclohexylidene-bridged bisphenol carbonate units of formula (9) may be provided with carbonate units of general formula (1) to form the copolymer, where $R^1$ of formula (1) is derived from a dihydroxy aromatic compound having a formula that is not identical to that of formula (7). In a specific embodiment, such a non-identical carbonate unit has the formula (10):

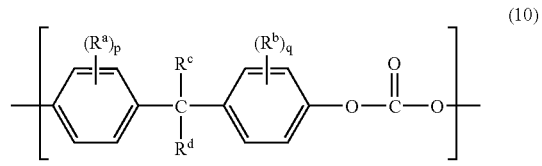

(10)

wherein $R^a$, $R^b$, $R^c$, $R^d$ are each as defined in formulas (3) and (4) above, and p and q are each independently 0 to 4.

In an embodiment, the alkyl-substituted polycarbonate comprises alkyl-substituted bisphenol carbonate units in an amount of 25 to 100 mole percent (mol %), specifically 30 to 100 mol %, more specifically 40 to 90 mol %, and still more specifically 50 to 80 mol %, based on the total mole percentage of alkyl-substituted bisphenol carbonate units and any non-identical carbonate units. Also in an embodiment, the alkyl-substituted polycarbonate comprises the non-identical carbonate units in an amount of 0 to 75 mol %, specifically 0 to 70 mol %, more specifically 10 to 60 mol %, and still more specifically 20 to 50 mol %, in which the sum of the mole percentages of the alkyl-substituted bisphenol carbonate unit and the non-identical carbonate unit is 100 mol %. In an embodiment, the polyester-polycarbonate consists essentially of alkyl-substituted bisphenol carbonate units, or alkyl-substituted bisphenol carbonate units and the non-identical carbonate units, where the sum of the mole percentages of alkyl-substituted bisphenol carbonate units and the non-identical carbonate units is 100 mol %. In an embodiment, the alkyl-substituted bisphenol carbonate units are of formula (8). In a specific embodiment, the alkyl-substituted bisphenol carbonate units are of formula (9). In a specific embodiment, the non-identical carbonate units comprise resorcinol carbonate units, bisphenol carbonate units, or a combination comprising resorcinol carbonate units and bisphenol carbonate units.

In a specific embodiment, the alkyl-substituted polycarbonate comprises alkyl-substituted cyclohexylidene-bridged bisphenol carbonate units of formula (9) and non-identical bisphenol carbonate units as shown in formula (11):

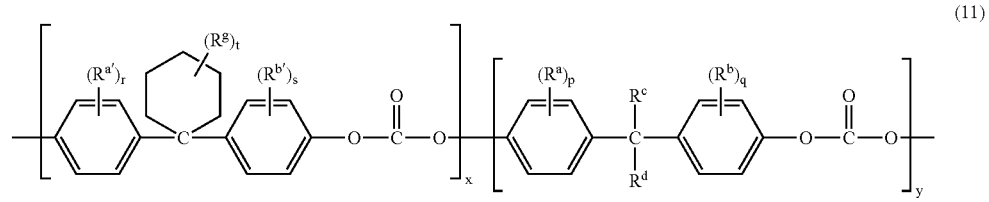

(11)

wherein $R^a$, $R^b$, $R^c$, $R^d$, p, and q are as described for formulas (3) and (4); $R^{a'}$, $R^{b'}$, $R^g$, r, s, and t are as described for formula (7); and the molar ratio of x to y is 25:75 to 100:0. In a specific embodiment, at least one each of $R^{a'}$ and $R^{b'}$ are disposed meta to the cyclohexylidene bridging group. In another specific embodiment, p and q are each 0. In another specific embodiment, the alkyl-substituted polycarbonate of formula (11) consists essentially of the alkyl-substituted bisphenol carbonate units of formula (9) and non-identical bisphenol carbonate units of formula (10). In an exemplary embodiment, the alkyl-substituted bisphenol polycarbonate is a copolymer comprising carbonate units derived from DMBPC and bisphenol A, and has the formula (12):

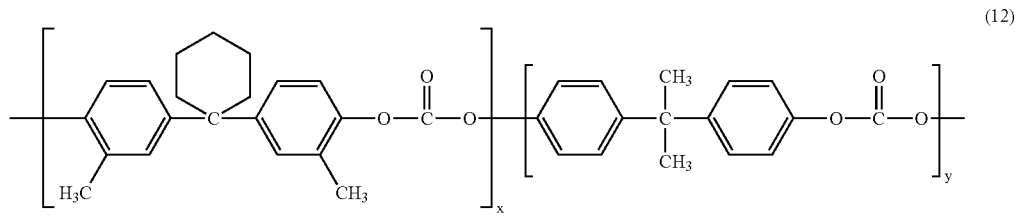

wherein the molar ratio of x and y is as described for formula (11). In another exemplary embodiment, the alkyl-substituted polycarbonate of formula (12) consists essentially of carbonate units derived from DMBPC and carbonate units derived from bisphenol A.

In an embodiment, the alkyl-substituted polycarbonate is present in the thermoplastic composition in an amount of 25 to 95 parts by weight (pbw), specifically 30 to 90 pbw, more specifically 40 to 85 pbw, based on 100 parts by weight of the alkyl-substituted polycarbonate copolymer, the polyester-polycarbonate, and any additional polycarbonate. The use of these particular polymeric components can provide specific, useful compositions having the desired properties. Therefore, in an embodiment, the thermoplastic composition consists essentially of the alkyl-substituted polycarbonate, the polyester-polycarbonate, and optionally an additional polycarbonate, wherein the sum of the parts by weight of the alkyl-substituted polycarbonate copolymer, the polyester-polycarbonate, and any additional polycarbonate is 100 parts by weight, and wherein the polymers are not identical.

In an embodiment, the thermoplastic composition can comprise an additional polycarbonate in an amount of 0 to 65 parts by weight (pbw), specifically 5 to 60 pbw, more specifically 10 to 55 pbw, based on 100 parts by weight of the alkyl-substituted polycarbonate copolymer, the polyester-polycarbonate, and the additional polycarbonate. The use of these particular polymeric components can provide specific, useful compositions having the desired properties. Therefore, in an embodiment, the thermoplastic composition consists essentially of the alkyl-substituted polycarbonate copolymer, the polyester-polycarbonate, and any additional polycarbonate. Where an additional polycarbonate is used, the additional polycarbonate is not identical to the alkyl-substituted polycarbonate. In an exemplary embodiment, an additional polycarbonate can be a linear homopolymer derived from bisphenol A.

The polycarbonate may have an intrinsic viscosity, as determined in chloroform at 25° C., of 0.3 to 1.5 deciliters per gram (dl/g), specifically 0.45 to 1.0 dl/g. The polycarbonates may have a weight average molecular weight ($M_w$) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards.

The polycarbonate has flow properties described by the melt volume flow rate (often abbreviated MVR), which measures the rate of extrusion of a thermoplastic polymer through an orifice at a prescribed temperature and load. Polycarbonates useful herein may have an MVR, measured at 300° C. under a load of 1.2 kg according to ASTM D1238-04, of 0.5 to 80 cubic centimeters per 10 minutes (cc/10 min). An exemplary polycarbonate can have an MVR measured at 300° C. under a load of 1.2 kg according to ASTM D1238-04, of 0.5 to 100 cc/10 min, specifically 1 to 75 cc/10 min, and more specifically 1 to 50 cc/10 min. Combinations of polycarbonates of different flow properties may be used to achieve the overall desired flow property.

The thermoplastic composition comprises a polyester-polycarbonate, also known as polyester carbonate, copolyester-polycarbonate, and copolyestercarbonate. Such copolymers further contain, in addition to recurring carbonate chain units of the formula (1), repeating ester units of formula (13):

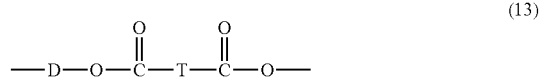

wherein D is a divalent group derived from a dihydroxy compound, and may be, for example, a $C_{2-30}$ alkylene group, a $C_{3-30}$ alicyclic group, a $C_{6-30}$ aromatic group or a polyoxyalkylene group in which the alkylene groups contain 2 to 6 carbon atoms, specifically 2, 3, or 4 carbon atoms; and T divalent group derived from a dicarboxylic acid, and may be, for example, a $C_{2-30}$ alkylene group, a $C_{6-30}$ alicyclic group, a $C_{6-30}$ alkyl aromatic group, or a $C_{6-30}$ aromatic group. In an embodiment, D is derived from a dihydroxy aromatic compound comprising formula (2), formula (3), formula (6), formula (7), or a combination comprising at least one of the foregoing dihydroxy aromatic compounds.

Examples of aromatic dicarboxylic acids from which the T group in the ester unit of formula (13) is derived include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 99:1 to 1:99. In an embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

In an embodiment, the ester units of the polyester or polyester block comprise arylate ester units derived from the reaction product of one equivalent of an isophthalic acid derivative and/or terephthalic acid derivative with a resorcinol of formula (6). In an embodiment, the polyester block or polymer comprises resorcinol arylate units of formula (14):

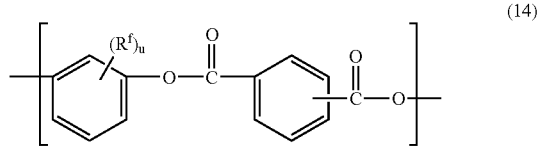
(14)

wherein $R^f$ and u are previously defined for formula (6). Such arylate ester units are also referred to herein as isophthalate-terephthalate-resorcinol ester units, sometimes referred to in abbreviated form as ITR ester units. As used herein, isophthalate-terephthalate-resorcinol ester units comprise a combination isophthalate esters, terephthalate esters, and resorcinol esters. In a specific embodiment, isophthalate-terephthalate-resorcinol ester units comprise a combination of isophthalate-resorcinol ester units and terephthalate-resorcinol ester units, wherein the molar ratio of isophthalate-resorcinol ester units to terephthalate-resorcinol ester units is 99:1 to 1:99, specifically 95:5 to 5:95, more specifically 90:10 to 10:90, and still more specifically 80:20 to 20:80. In a specific embodiment, where u is 0, the arylate ester units comprise isophthalate-terephthalate-resorcinol ester units in which the resorcinol is 1,3-dihydroxybenzene.

Exemplary aromatic polyester blocks include poly(isophthalate-terephthalate-resorcinol)esters, poly(isophthalate-terephthalate-bisphenol-A)esters, poly[(isophthalate-terephthalate-resorcinol)ester-co-(isophthalate-terephthalate-bisphenol-A)]ester, or a combination comprising at least one of these. In an embodiment, a useful arylate polyester block is a poly(isophthalate-terephthalate-resorcinol)ester.

Thermoplastic compositions as disclosed herein are weatherable compositions comprising isophthalate-terephthalate-resorcinol ester units. It is known in the art that exposure of isophthalate-terephthalate-resorcinol esters such as in formula (15) to ultraviolet radiation can cause a rapid photochemically induced rearrangement known as a Photo-Fries rearrangement, to form the 2-hydroxy benzophenone of formula (16) at the surface, which acts as an ultraviolet absorber and stabilizer for the underlying polymer. Compositions comprising resorcinol ester units thus undergo only a slow Photo-Fries rearrangement below the surface of the composition, and so are both resistant to weathering and are suitable for use in the thermoplastic compositions disclosed herein.

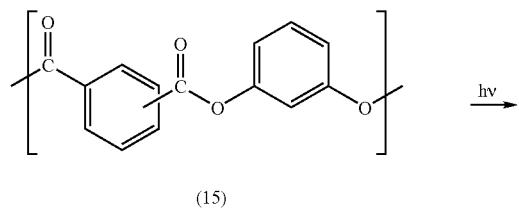
(15)

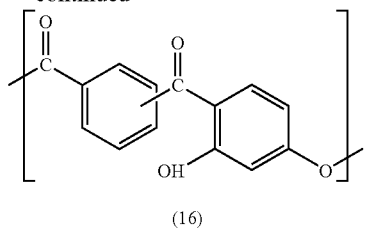
(16)

Other ester units, such as bisphenol ester units of formula (17), also undergo Photo-Fries rearrangement to form the corresponding 2-hydroxy benzophenone having formula (18). Because of the electronic structure of these species, there is a greater absorbance of the light at a wavelength of about 400 nm. As a result, the transmitted or reflected light has an observable and undesirable yellow color, measurable by yellowing index ("YI"). Thus, for weatherable applications, it is further desirable to minimize the number of bisphenol ester units present in weatherable polyester-polycarbonates and articles derived therefrom.

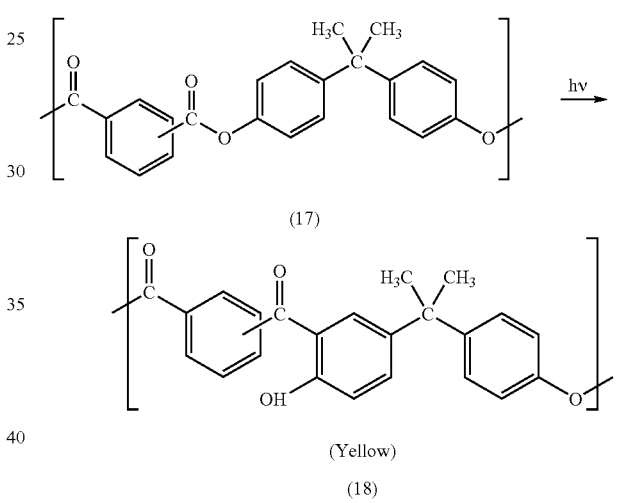
(17)

(Yellow)
(18)

The polyester-polycarbonates disclosed herein have the general formula (19):

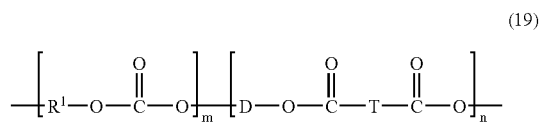
(19)

wherein $R^1$ is as described for formula (1), D and T are as defined for formula (13), and m and n are each independently integers greater than or equal to 1.

In an embodiment, the polyester-polycarbonate blocks comprise arylate ester units as shown in formula (20):

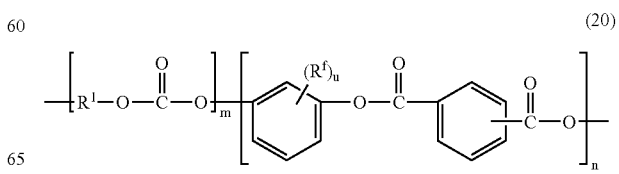
(20)

wherein $R^f$, u, and m are as defined in formula (6), each $R^1$ is independently a $C_{6-30}$ aromatic group, and m and n are each independently greater than or equal to one. In an embodiment, m and n are each independently 5 to 500, specifically 10 to 300, and more specifically 15 to 200. In an embodiment, the molar ratio of the arylate ester units to the carbonate units in the polyester-polycarbonate can be 1:99 to 99:1, specifically 5:95 to 90:10, and more specifically 10:90 to 80:20. In a specific embodiment, the arylate ester units are isophthalate-terephthalate-resorcinol ester units.

In a specific embodiment, the carbonate units of the polyester-polycarbonate can comprise resorcinol carbonate units, derived from resorcinols of formula (6), and having formula (21):

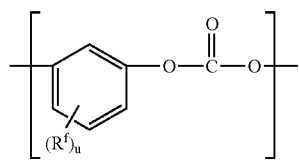
(21)

wherein $R^f$ and u are as described above. In another embodiment, a polyester-polycarbonate comprises bisphenol carbonate units of formula (9). In another embodiment, the carbonate units comprise a combination of resorcinol carbonate units of formula (20) and bisphenol carbonate units of formula (9). Where a combination of resorcinol carbonate units and bisphenol carbonate units is used, the molar ratio of resorcinol carbonate units to bisphenol carbonate units is 1:99 to 99:1, specifically 5:95 to 90:10, and more specifically 10:90 to 80:20.

In an embodiment, the polyester-polycarbonate comprises arylate ester units in an amount of 10 to 90 mole percent (mol %), specifically 15 to 80 mol %, and more specifically 20 to 70 mol %, based on the total mole percentage of arylate ester units and carbonate units. In an embodiment, the polyester-polycarbonate comprises carbonate units in an amount of 10 to 90 mol %, specifically 15 to 85 mol %, and specifically 20 to 80 mol %, based on the total mole percentage of arylate ester units and carbonate units. In an embodiment, the polyester-polycarbonate consists essentially of arylate ester units, resorcinol carbonate units, and bisphenol carbonate units, where the sum of the mole percentages of arylate ester units, resorcinol carbonate units, and bisphenol carbonate units is 100 mol %.

In a specific embodiment, the polyester-polycarbonate comprises formula (22):

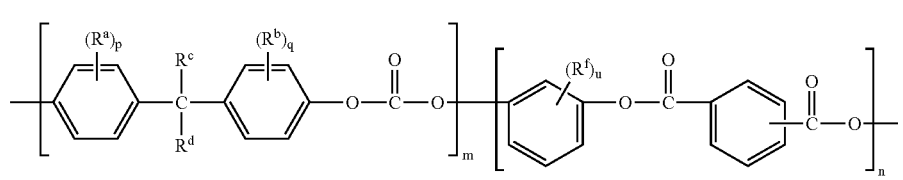
(22)

wherein $R^a$, $R^b$, $R^c$, $R^d$, p, and q are as defined for formula (4), $R^f$ and u are each as defined for formula (6), and the molar ratio of m to n is 95:5 to 10:90.

In a more specific embodiment, the polyester-polycarbonate consists essentially of formula (23):

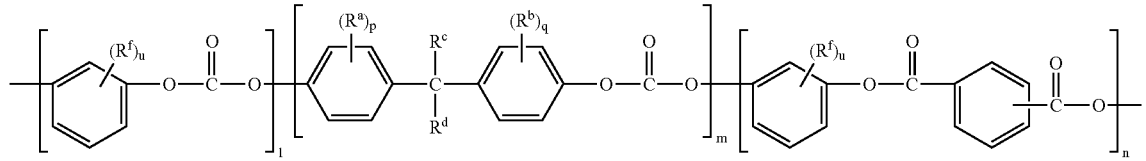
(23)

wherein $R^a$, $R^b$, $R^c$, $R^d$, p, and q are as defined for formula (4), $R^f$ and u are each independently as defined for formula (6), l is 0 to 30 mol %, m is 10 to 95 mol %, and n is 5 to 90 mol %, and the sum of l, m, and n is 100 mol %.

In an exemplary embodiment, the polyester-polycarbonate comprises isophthalate-terephthalate-resorcinol ester units and bisphenol A units, and has the formula (24):

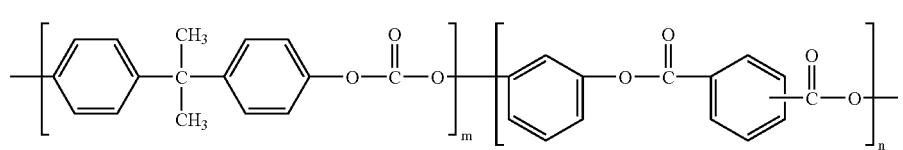
(24)

wherein the molar ratio of m to n is 95:5 to 10:90.

In an embodiment, a polyester-polycarbonate may have an $M_w$ of 2,000 to 100,000 g/mol, specifically 3,000 to 75,000 g/mol, more specifically 4,000 to 50,000 g/mol, more specifically 5,000 to 30,000 g/mol, and still more specifically 7,000 to 25,000 g/mol. Molecular weight determinations are performed using GPC using a crosslinked styrene-divinyl benzene column, at a sample concentration of 1 milligram per milliliter, and as calibrated with polycarbonate standards. Samples are eluted at a flow rate of about 1.0 ml/min.

In an embodiment, the thermoplastic composition comprises polyester-polycarbonate in an amount of 5 to 75 parts by weight (pbw), specifically 10 to 70 pbw, more specifically 15 to 60 parts by weight, based on 100 parts by weight of the alkyl-substituted polycarbonate copolymer, the polyester-polycarbonate, and any additional polycarbonate. The use of these particular polymeric components can provide specific, useful compositions having the desired properties. Therefore, in an embodiment, the thermoplastic composition consists essentially of the alkyl-substituted polycarbonate copolymer, the polyester-polycarbonate, and any additional polycarbonate.

In another embodiment, the thermoplastic composition comprises 5 to 40 mole percent (mol %) of arylate ester units, specifically 7 to 35 mol % arylate ester units; specifically 10 to 30 mol % arylate ester units, based on the total number of moles of arylate ester units and carbonate units present.

In another embodiment, the thermoplastic composition comprises 5 to 40 weight percent (wt %) of arylate ester units, specifically 7 to 35 wt % arylate ester units; specifically 10 to 30 wt % arylate ester units, based on the total weight of alkyl-substituted polycarbonate copolymer, the polyester-polycarbonate, and any additional polycarbonate.

Polycarbonates and polycarbonate-containing copolymers can be manufactured by different polymerization methods such as, for example, solution polymerization, interfacial polymerization, and melt polymerization. Of these, a specifically useful method is interfacial polymerization. Although the reaction conditions for interfacial polymerization can vary, a process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11.5. The most commonly used water immiscible solvents include methylene chloride, 1,2-dichloroethane, chlorobenzene, toluene, and the like. Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

A chain-stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates. Where a chain-stopper is incorporated with the polycarbonate, the chain-stopper may also be referred to as an end group.

For example, mono-phenolic compounds useful as chain-stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be useful as chain-stoppers. These include monocyclic, mono-carboxylic acid chlorides such as benzoyl chloride, $C_1$-$C_{22}$ alkyl-substituted benzoyl chloride, 4-methylbenzoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with up to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted substituted phenyl chloroformate p-cumyl phenyl chloroformate, toluene chloroformate, and combinations thereof.

Among the phase transfer catalysts that may be used in interfacial polymerization are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. In an embodiment, a specifically useful phase transfer catalyst is $CH_3[CH_3(CH_2)_3]_3NCl$ (methyl tri-n-butyl ammonium chloride). An effective amount of a phase transfer catalyst may be 0.1 to 10 wt % based on the weight of bisphenol in the phosgenation mixture. In another embodiment an effective amount of phase transfer catalyst may be 0.5 to 2 wt % based on the weight of dihydroxy aromatic compound in the phosgenation mixture.

Polyester-polycarbonates may also be prepared by interfacial polymerization. Typically, a reactive derivative of the desired aromatic or aliphatic dicarboxylic acid is used. In an embodiment, the dicarboxylic acid dihalide is used, in particular dicarboxylic acid dichlorides and dicarboxylic acid dibromides, which are condensed under interfacial polymerization conditions as described above (biphasic solvent, pH of 7 to 11, and addition of base to maintain a desired pH) with dihydroxy aromatic compounds in a pre-carbonate condensation to form the polyester units. In an exemplary embodiment, instead of using isophthalic acid, terephthalic acid, or combinations thereof, it is possible and even desirable to employ isophthaloyl dichloride, terephthaloyl dichloride, and combinations thereof in the preparation of polyesters having arylate ester units. After interfacial polymerization to condense the dicarboxylic acid derivative and dihydroxy aromatic compound, sometimes referred to as polyester oligomerization, the resulting polyester polymer or oligomer is co-condensed with a dihydroxy aromatic compound under interfacial polycarbonate reaction conditions to form the polyester-polycarbonate. In an exemplary embodiment, a dihydroxy aromatic compound of formula (2), (3), (6), or (7) is used in either or both of the polyester oligomerization or the interfacial polycarbonate reaction.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, single or twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl)carboxylate, bis(4-acetylphenyl)carboxylate, or a combination comprising at least one of the foregoing. In addition, exemplary transesterification catalysts may include phase transfer catalysts of formula $(R^3)_4Q^+X$ above, wherein each $R^3$, Q, and X are as defined above. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and combinations of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), trisphenol PA (4(4(1,1-bis(p-hydroxyphenyl)-ethyl)alpha, alpha-dimethyl benzyl)phenol), 4-chloroformyl phthalic anhydride trimesic acid, and benzophenone tetracarboxylic acid. The branching agents may be added at a level of 0.05 to 2.0 wt % of the polycarbonate. All types of polycarbonate end groups are contemplated as being useful in the polycarbonate or polycarbonate-containing polymer, provided that such end groups do not significantly affect desired properties of the thermoplastic compositions.

Polycarbonates may be compositionally modified to provide improved resistance to scratching and abrasion. It has been found that scratch resistance of such polycarbonate polymers may be improved by adding to the polymer composition monomeric carbonate units derived from dihydroxy aromatic compounds having substituent groups that can increase the hardness of a polycarbonate. Useful carbonate groups are derived from the carbonate polymerization of specific dihydroxy aromatic compounds having the structures shown in Formula (4) (where p and q are each one or greater) and (7). A useful structural feature of such dihydroxy aromatic compounds is an alkylidene or cycloalkylidene bridging group, corresponding to $X^a$ of formula (4). Such groups are derived from the derived from a substituted or unsubstituted, cyclic or acyclic ketone which is condensed with a substituted or unsubstituted phenol, and preferably a phenol that is unsubstituted para or ortho to the phenolic hydroxy group. Inclusion of the alkylidene group as a bridging substituent can, when incorporated into the backbone chain of a polycarbonate polymer, decrease the flexibility of the polycarbonate chain and thereby increase the glass transition temperature of the polycarbonate. This can increase the stiffness of the polycarbonate chain, and may improve the scratch resistance. In addition, inclusion of alkyl substituents on the phenolic rings ortho to the hydroxy group can improve the scratch resistance. It is believed that inclusion of alkyl substituents on the aromatic rings of the bisphenol can increase the rotational energy barrier of the carbonate units, increasing the glass transition temperature and hence the stiffness of the polymer, and thereby improve the scratch resistance. In addition, alkyl substituents can increase the resistance of adjacent carbonate functional groups to attack by base or other nucleophiles, such as, for example, ammonia or other amine. Useful dihydroxy aromatic compounds include, for example, those having alkyl substituents on the aromatic rings in formula (4) or (7), in which p and q in formula (4) or r and s in formula (7) are each 1, 2, or more, $R^a$ and $R^b$ in formula (4) or $R^{a'}$ and $R^{b'}$ in formula (7) are each methyl or other alkyl, and $R^a$ and $R^b$ or $R^{a'}$ and $R^{b'}$ are each disposed ortho to the site of the phenolic hydroxy group for the polymer backbone connectivity (i.e., meta to the bridging alkylidene, where the alkylidene bridge and hydroxy group are disposed para to each other).

Thermoplastic compositions, as disclosed herein, should convey scratch resistance to articles prepared therefrom. A convenient measure of scratch resistance is the pencil hardness test, in which an article prepared from the composition is scratched using sharpened pencils of varying hardness (e.g., 6B, 5B, 4B, 3B, 2B, B, HB, F, H, 2H, 3H, 4H, 5H, and 6H, where 6B is the softest and 6H is the hardest). The pencil hardness that no longer scratches the surface corresponds to the approximate hardness of the thermoplastic composition. Another method for determining hardness of a composition is using the Erichson scratch test, which is similar to the standard scratch test method described in ISO 1518:2001, in which a needle of a specific size and shape under a constant downward force, and held at an angle of 90 degrees relative to the surface to be tested, is applied to the surface of an article consisting of the composition, while the article is moved under the needle by a moving stage. The depth of the resulting scratch, as determined using profilometry, is the measure of the scratch resistance.

In addition, it has been shown that polyester-polycarbonates including isophthalate-terephthalate-resorcinol (ITR) ester groups have a high degree of resistance to photolytic degradation (i.e., weatherability) under conditions of light exposure or both light exposure and moisture. A useful measure of weatherability of such polyester-polycarbonate compositions, in particular for opaque and/or colored compositions, is the retention of surface gloss for the composition. Polycarbonates can have high surface gloss, and the retention of the gloss is desirable for the manufacture of articles for which a shiny, aesthetically appealing surface and/or high degree of color. Where the surface gloss is reduced by weathering, the color and/or surface appearance is degraded and attains a whitish cast, due to scattering of light by the degraded surface. It has been found that addition of such polyester-polycarbonates to polycarbonates having a dissimilar structure can improve the weatherability, and hence the surface gloss after weathering, of the net composition.

Surprisingly, it has been found that a thermoplastic composition comprising a combination of a polycarbonate comprising alkyl-substituted bisphenol carbonate units with a polyester-polycarbonate comprising weatherable arylate ester units, provides a synergistically high gloss retention of greater than or equal to 50% after weathering according to ISO 4892-2A using a xenon arc lamp, and as measured according to ASTM D2457-03. Specifically useful arylate ester units are isophthalate-terephthalate-resorcinol ester (ITR) units. Thermoplastic compositions that include a colorant are specifically useful. In an embodiment, an article comprising the thermoplastic composition has a black color. The gloss retention upon weathering for the thermoplastic composition is unexpectedly and desirably higher than that calculated from the additive values of gloss retention for the component alkyl-substituted polycarbonate and the polyester-polycarbonate that would be expected for the corresponding additive weight fractions of these polymers. Also after weathering, the article comprising the thermoplastic composition has a gloss retention that is greater than or equal to 10% higher than would be expected for a given percentage of ITR ester units without the presence of the alkyl-substituted polycarbonate. The combination further unexpectedly improves the scratch resistance of the thermoplastic composition, at a value desirably less than that expected from an additive combination of the values of scratch resistance for each of the alkyl-substituted polycarbonate and the polyester-polycarbonate. The pencil scratch test performance of the weathered thermoplastic composition according to ASTM D3363-92a above provides a pencil hardness of HB or harder. In addition, the Erichson scratch test results in a 90 degree scratch depth of less than 19 micrometers (□m) under a downward force of 6 Newtons. Thus, the combination of alkyl-substituted bisphenol carbonate units and arylate ester units further provides a synergistic improvement in scratch resistance over the linear combination of the scratch resistance values for the alkyl-substituted polycarbonate and the polyester-polycarbonate independently. Thus, the combination of alkyl-substituted bisphenol carbonate units and arylate ester units unexpectedly provides a synergistic value for both gloss retention and scratch resistance that in combination are improved over the values expected for both of these properties based on a linear combination of the alkyl-substituted polycarbonate and the polyester-polycarbonate. The greatest improvement in gloss retention with simultaneous desirable scratch test performance can be obtained where the thermoplastic composition has a molar amount of arylate ester of greater than or equal to 10 mol %, specifically greater than or equal to 20 mol %, and a molar amount of alkyl-substituted bisphenol carbonate of greater than or equal to 25 mol %.

The thermoplastic composition also has greater resistance to weathering by ultraviolet radiation and/or moisture in air than other compositions that do not include ITR units. It has been found that the combination of DMBPC units and ITR units in the thermoplastic composition provides excellent weathering according to an appropriate weathering protocol, such as ISO 4892-2A or ASTM G155-04a, using a xenon arc lamp as a light source and exposing the samples to the light (i.e., UV radiation) for greater than or equal to 500 hours. Further, the weather resistance of the isophthalate-terephthalate-resorcinol ester units provides an improvement in yellowness (as measured by change in yellowness index after weathering) and hence better transparency. Also, formation of haze in the thermoplastic composition after weathering can also be mitigated. It is believed that inclusion of relatively small amounts (i.e., as low as about 5 weight percent) of the ITR units in the in the overall thermoplastic composition acts synergistically with the alkyl-substituted bisphenol polycarbonate to produce a composition with improved photolytic weathering resistance.

The thermoplastic composition from which the article for testing is molded can contain additives typically included with polycarbonates, such as mold release agents and antioxidants, wherein the presence of these additives in an amount effective to perform the intended function does not significantly adversely affect the desired properties of the thermoplastic composition. Typically the total amount of these additives is less than or equal to 5.0 weight percent (wt %), specifically less than or equal to 1 wt %, of the total weight of components present in thermoplastic composition. In an exemplary embodiment, additives present in the thermoplastic composition used to prepare a molded article for optical testing (haze and/or percent transmission) may include 0.2 to 0.4 weight percent pentaerythritol tetrastearate as a mold release agent, and 0.01 to 0.04 weight percent of 2,6-di-tert-butylphenyl)phosphite as an antioxidant.

Thermoplastic compositions provide excellent gloss retention upon weathering according to ISO 4892-2A. In an embodiment, a molded color chip of 3.2±0.12 mm thickness and consisting of the thermoplastic composition has, upon weathering according to ISO 4892-2A for 500 hours using a xenon arc lamp, a gloss retention after weathering of greater than 50%, specifically greater than or equal to 55%, more specifically greater than or equal to 60%, and still more specifically greater than or equal to 65% when compared with the unweathered article, and when measured at an angle of 60 degrees (°) and calibrated using a black glass standard of 100 gloss units (GU) according to ASTM D2457-03.

In addition, the thermoplastic composition has a higher gloss retention upon weathering than would be expected based on the expected gloss retention value calculated from the gloss retention values corresponding to the additive weight fractions of the component alkyl-substituted polycarbonate and ITR-containing polyester-polycarbonate. Thus, in an embodiment, the gloss retention of an article consisting of the alkyl-substituted polycarbonate and ITR-containing polyester-polycarbonate and after weathering according to ISO 4892-2A for 500 hours using a xenon arc lamp, is higher than expected for a given percentage of ITR ester units without the presence of alkyl-substituted polycarbonate by an amount greater than or equal to 10%, specifically greater than or equal to 12%, more specifically greater than or equal to 15%, and still more specifically greater than or equal to 18%, based on 100% gloss retention measured according ASTM D2457-03 for the unweathered article.

In an embodiment, an article consisting of the thermoplastic composition has a pencil hardness of HB or harder, specifically F or harder, as measured using the pencil scratch test according to ASTM D3363-92A in which the pencil hardnesses used include 6B, 5B, 4B, 3B, 2B, B, HB, F, H, 2H, 3H, 4H, 5H, and 6H, where 6B is the softest and 6H is the hardest.

In an embodiment, an article consisting of the thermoplastic composition has a 90 degree scratch resistance of less than 19 □m, specifically less than or equal to 18.5 □m more specifically less than or equal to 18.25□m, and still more specifically less than or equal to 18 □m, as measured at 6 Newtons downward force The thermoplastic composition can further comprise an additional resin. Additional resins that can be used include: polycarbonates as described above, including homopolycarbonates, copolycarbonates, and polyester-polycarbonates; polysiloxane-polycarbonates; and polyesters. In addition, combinations of additional polymers, for example combinations of homopolycarbonates and/or other polycarbonate copolymers with polyesters, may be used.

The thermoplastic compound can include a polysiloxane-polycarbonate. Polysiloxane-polycarbonates include polysiloxane blocks and carbonate units. Polysiloxane (also referred to herein as "polydiorganosiloxane") blocks comprise repeating siloxane units (also referred to herein as "diorganosiloxane units") of formula (25):

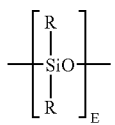
(25)

wherein each occurrence of R is same or different, and is a $C_{1-13}$ monovalent organic group. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of E in formula (25) may vary widely depending on the type and relative amount of each component in the thermoplastic composition, the desired properties of the composition, and like considerations. Generally, E can have an average value of 1 to 1,000. In an exemplary embodiment, a polysiloxane can have an average value of E of 1 to 100, specifically 5 to 75, and more specifically 10 to 55.

In an embodiment, the polydiorganosiloxane blocks are provided by repeating structural units of formula (26):

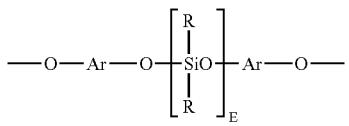
(26)

wherein E is as defined above; each R may independently be the same or different, and is as defined above; and each Ar may independently be the same or different, and is a substituted or unsubstituted $C_6$-$C_{30}$ arylene group, wherein the bonds are directly connected to an aromatic moiety. Useful Ar groups in formula (26) may be derived from a $C_6$-$C_{30}$ dihydroxy aromatic compound, for example a dihydroxy aromatic compound of formula (2), (3), (6), or (7) above. Combinations comprising at least one of the foregoing dihydroxy aromatic compounds may also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds may also be used.

Units of formula (26) may be derived from the corresponding dihydroxy aromatic compound of formula (27):

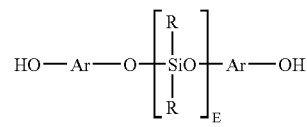
(27)

wherein R, Ar, and E are as described above.

Polydiorganosiloxane blocks can also comprise units of formula (28):

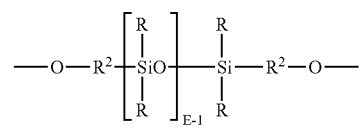
(28)

wherein R and E are as described for formula (25), and each occurrence of $R^2$ is independently a divalent $C_1$-$C_{30}$ alkylene or $C_7$-$C_{30}$ arylene-alkylene. The polymerized polysiloxane unit is the reaction residue of its corresponding dihydroxy aromatic compound. In a specific embodiment, where $R^2$ is $C_7$-$C_{30}$ arylene-alkylene, the polydiorganosiloxane blocks are provided by repeating structural units of formula (29):

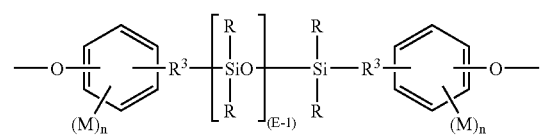
(29)

wherein R and E are as defined for formula (25). Each $R^3$ in formula (29) is independently a divalent $C_1$-$C_8$ aliphatic group. Each M in formula (29) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^3$ is a divalent $C_1$-$C_3$ aliphatic group, and R is methyl.

Units of formula (29) may be derived from the corresponding dihydroxy polydiorganosiloxane (30):

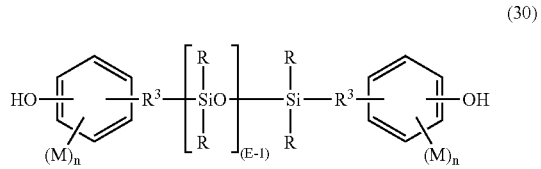

wherein R, D, M, R³, E, and n are as described for formula (29).

Dihydroxy polysiloxanes typically can be made by functionalizing a substituted siloxane oligomer of formula (31):

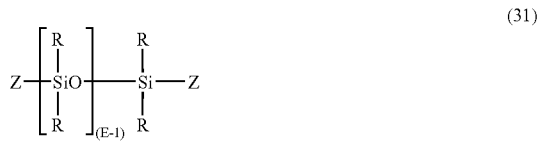

wherein R and E are as previously defined in formula (25), and Z is H, halogen (Cl, Br, I), or carboxylate. Exemplary carboxylates include acetate, formate, benzoate, and the like. In an exemplary embodiment, where Z is H, compounds of formula (30) may be prepared by platinum catalyzed addition with an aliphatically unsaturated monohydric phenol. In an exemplary embodiment, aliphatically unsaturated monohydric phenols include eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing may also be used. Where Z is halogen or carboxylate, functionalization may be accomplished by reaction with a dihydroxy aromatic compound of formulas (2), (3), (6), (7), or a combination comprising at least one of the foregoing dihydroxy aromatic compounds. In an exemplary embodiment, compounds of formula (25) may be formed from an alpha, omega-bisacetoxypolydiorangonosiloxane and a dihydroxy aromatic compound under phase transfer conditions.

An exemplary polysiloxane-polycarbonate can include, in addition to polysiloxane units, carbonate units derived from bisphenol A, e.g., the dihydroxy aromatic compound of formula (2) in which each of A¹ and A² is p-phenylene and Y¹ is isopropylidene. Such polysiloxane-polycarbonates may have an $M_w$ of 2,000 to 100,000 g/mol, specifically 5,000 to 50,000 g/mol as measured by GPC using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C. under a load of 1.2 Kg, of 1 to 50 cubic centimeters per 10 minutes (cc/10 min), specifically 2 to 30 cc/10 min. Combinations of polysiloxane-polycarbonates of different flow properties may be used to achieve the overall desired flow property.

A polyester can be used as an additional polymer. Exemplary polyesters may include, for example, polyesters having repeating units of formula (12), which include poly(alkylene dicarboxylates), liquid crystalline polyesters, and polyester copolymers. The polyesters described herein are desirably completely miscible with the polycarbonates when blended.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition.

Useful polyesters may include aromatic polyesters, poly(alkylene esters) including poly(alkylene arylates), and poly(cycloalkylene diesters). Aromatic polyesters may have a polyester structure according to formula (13), wherein D and T are each aromatic groups as described hereinabove. In an embodiment, useful aromatic polyesters may include, for example, poly(isophthalate-terephthalate-resorcinol)esters, poly(isophthalate-terephthalate-bisphenol-A)esters, poly[(isophthalate-terephthalate-resorcinol)ester-co-(isophthalate-terephthalate-bisphenol-A)]ester, or a combination comprising at least one of the foregoing. Also contemplated are aromatic polyesters with a minor amount, e.g., from 0.5 to 10 percent by weight, of units derived from an aliphatic diacid and/or an aliphatic polyol to make copolyesters.

Poly(alkylene arylates) may have a polyester structure according to formula (13), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene)dimethylene.

Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A specifically useful poly(cycloalkylene diester) is poly(1,4-cyclohexanedimethylene terephthalate) (PCT). Combinations comprising at least one of the foregoing polyesters may also be used.

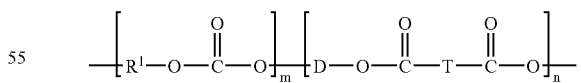

wherein R¹, D, and T are each independently a $C_{6-30}$ aromatic group, and the molar ratio of m to n is 95:5 to 10:90; and C) 0 to 65 parts by weight of a second polycarbonate, wherein the first polycarbonate and second polycarbonate are not identical, and the sum of the parts by weight of the first polycarbonate, the polyester-polycarbonate, and the second polycarbonate is 100 parts by weight.

In another embodiment, a thermoplastic composition consists essentially of A) 25 to 95 parts by weight of a first polycarbonate consisting essentially of i) 25 to 100 mole percent of a first carbonate unit having the formula:

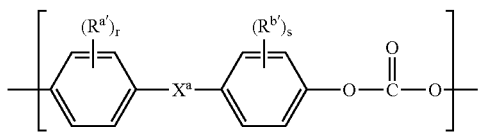

wherein $R^{a'}$ and $R^{b'}$ are each independently $C_{1-12}$ alkyl, $X^a$ is a $C_{1-18}$ alkylidene bridging group, a $C_{3-18}$ cycloalkylidene bridging group, or a $C_{9-18}$ fused cycloalkylidene-aromatic bridging group, and r and s are each independently 1 to 4, provided that at least one of each of $R^a$ and $R^b$ is disposed meta to $X^a$, and ii) 0 to 75 mole percent of a second carbonate unit having the formula:

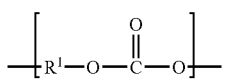

wherein each $R^1$ is a $C_{6-30}$ aromatic group, the first carbonate unit and second carbonate unit are not identical, and the sum of the mole percentages of the first carbonate unit and second carbonate unit in the first polycarbonate is 100 mole percent; B) 5 to 75 parts by weight of a polyester-polycarbonate having the formula:

Copolymers comprising alkylene terephthalate repeating ester units with other ester groups may also be useful. Specifically useful ester units may include different alkylene terephthalate units, which can be present in the polymer chain as individual units, or as blocks of poly(alkylene terephthalates). Specifically useful examples of such copolymers include poly(1,4-cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may include poly(alkylene cyclohexanedicarboxylate)s. Of these, a specific example is poly(1,4-cyclohexane-dimethanol-1,4-cyclohexanedicarboxylate) (PCCD), having recurring units of formula (32):

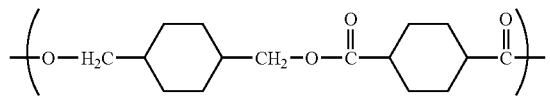

wherein, as described using formula (13), D is a dimethylene cyclohexane group derived from cyclohexane dimethanol, and T is a cyclohexane ring derived from cyclohexanedicarboxylate or a chemical equivalent thereof and is selected from the cis-isomer, trans-isomer, or a combination of cis- and trans-isomers.

The polyester may be used in a weight ratio of 1:99 to 99:1, specifically 10:90 to 90:10, and more specifically 30:70 to 70:30, based on the total weight of alkyl-substituted polycarbonate, polyester-polycarbonate, and any additional polycarbonate, depending on the function and properties desired.

In addition to the inclusion of other polymers, additives ordinarily incorporated with thermoplastic compositions of this type may be used as well. Combinations of additives may be used. Such additives may be included during the mixing of the components to form the thermoplastic composition. Use of additives in the thermoplastic composition carries the proviso that the additive and amount are selected such that its inclusion does not significantly adversely affect the haze of the thermoplastic composition, and does not significantly adversely affect the desired mechanical properties of the thermoplastic composition, such as for example the impact properties.

Additives for use in the thermoplastic composition may include impact modifier(s). These impact modifiers include elastomer-modified graft copolymers comprising (i) an elastomeric (i.e., rubbery) polymer substrate having a $T_g$ less than or equal to about 10° C., more specifically less than or equal to about −10° C., or more specifically about −40° to about −80° C., and (ii) a rigid polymeric superstrate grafted to the elastomeric polymer substrate. Elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Materials for use as the elastomer phase may include, for example, conjugated diene rubbers; copolymers of a conjugated diene with less than or equal to about 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Useful conjugated diene monomers for preparing the elastomer phase are of formula (33):

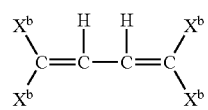

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and at least one monomer copolymerizable therewith. Monomers that are useful for copolymerization with the conjugated diene include monovinylaromatic monomers containing condensed aromatic ring structures, such as vinyl naphthalene, vinyl anthracene, and the like, or monomers of formula (34):

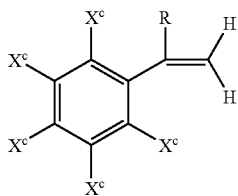

(34)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ arylalkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of useful monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (35):

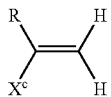

(35)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (35) include acrylonitrile, methacrylonitrile, alpha-chloroacrylonitrile, beta-chloroacrylonitrile, alpha-bromoacrylonitrile, acrylic acid, methyl(meth)acrylate, ethyl (meth)acrylate, n-butyl(meth)acrylate, t-butyl(meth) acrylate, n-propyl(meth)acrylate, isopropyl(meth)acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Combinations of the foregoing monovinyl monomers and monovinylaromatic monomers may also be used.

(Meth)acrylate monomers of use in the elastomeric phase may be cross-linked, particulate emulsion homopolymers or copolymers of $C_{1-8}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl(meth)acrylate monomers may optionally be polymerized in admixture with less than or equal to about 15 wt % of comonomers of formulas (33), (34), or (35), based on the total monomer weight. Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and combinations comprising at least one of the foregoing comonomers. Optionally, less than or equal to about 5 wt % of a polyfunctional crosslinking comonomer may be present, based on the total monomer weight. Such polyfunctional crosslinking comonomers may include, for example, divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl(meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semi-batch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and specifically has a gel content greater than 70%. Also useful are combinations of butadiene with styrene and/or $C_{4-6}$ alkyl acrylate rubbers.

The elastomeric phase comprises about 5 to about 95 wt % of the total graft copolymer, more specifically about 20 to about 90 wt %, and even more specifically about 40 to about 85 wt % of the elastomer-modified graft copolymer, the remainder being the rigid graft phase.

The rigid phase of the elastomer-modified graft copolymer may be formed by graft polymerization of a combination comprising a monovinylaromatic monomer and optionally at least one comonomer in the presence of at least one elastomeric polymer substrates. The above-described monovinylaromatic monomers of formula (34) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Useful comonomers include, for example, the above-described monovinylic monomers and/or monomers of the general formula (33). In one embodiment, R is hydrogen or $C_1$-$C_2$ alkyl, and $X^c$ is cyano or $C_1$-$C_{12}$ alkoxycarbonyl. Specific examples of comonomers for use in the rigid phase include acrylonitrile, methacrylonitrile, methyl(meth)acrylate, ethyl(meth)acrylate, n-propyl(meth)acrylate, isopropyl(meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise less than or equal to about 100 wt % of monovinyl aromatic monomer, specifically about 30 to about 100 wt %, more specifically about 50 to about 90 wt % monovinylaromatic monomer, with the balance of the rigid phase being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt % elastomer-modified graft copolymer and about 5 to about 65 wt % graft copolymer, based on the total weight of the impact modifier. In another embodiment, such impact modifiers comprise about 50 to about 85 wt %, more specifically about 75 to about 85 wt % rubber-modified graft copolymer, together with about 15 to about 50 wt %, more specifically about 15 to about 25 wt % graft copolymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, or a combination comprising at least one of the foregoing. The polymerizable alkenyl-containing organic material may be, for example, a monomer of formula (34) or (35), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The second graft link monomer is a polyethylenically unsaturated compound having at least one allyl group, such as allyl methacrylate, triallyl cyanurate, triallyl isocyanurate, and the like, or a combination comprising at least one of the foregoing.

The silicone-acrylate impact modifiers can be prepared by emulsion polymerization, wherein, for example a silicone rubber monomer is reacted with a first graft link monomer at a temperature from about 30 to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methacryloxypropyl)methyldimethoxysilane. A branched acrylate rubber monomer is then polymerized with the silicone rubber particles, optionally in presence of a cross linking monomer, such as allyl methacrylate, in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier. This method can be generally used for producing the silicone-acrylate impact modifier having a particle size of about 100 nanometers to about 2 micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semi-batch, or batch processes.

In one embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Useful surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, or a combination comprising at least one of the foregoing. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers may be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES). When present, impact modifiers can be present in the thermoplastic composition in amounts of 1 to 30 parts by weight, based on 100 parts of the combined weight of alkyl-substituted polycarbonate, polyester-polycarbonate, and any additional polymer.

The thermoplastic composition may comprise a colorant such as a pigment and/or dye additive. Useful pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, anthrones, dioxazines, phthalocyanines, and azo lakes; Pigment Brown 24, Pigment Red 101, Pigment Red 122, Pigment Red 149, Pigment Red 177, Pigment Red 179, Pigment Red 202, Pigment Violet 29, Pigment Blue 15, Pigment Blue 15:4, Pigment Blue 28, Pigment Blue 60, Pigment Green 7, Pigment Yellow 119, Pigment Yellow 147, or Pigment Yellow 150; or combinations comprising at least one of the foregoing pigments. In an embodiment, a pigment or combination of pigments is used which provides a black color for the thermoplastic composition. Pigments can be used in amounts of 0.01 to 10 parts by weight, based on 100 parts of the combined weight of alkyl-substituted polycarbonate, polyester-polycarbonate, and any additional polymer.

Useful dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Where it is desirable to use organic dyes and pigments, the dyes may be screened to determine their sensitivity to gamma radiation at a given exposure dose or range of exposure doses. In an embodiment, a dye or combination of dyes is used which provides a black color for the thermoplastic composition. Dyes can be used in amounts of 0.01 to 10 parts by weight, based on 100 parts of the combined weight of alkyl-substituted polycarbonate, polyester-polycarbonate, and any additional polymer.

The thermoplastic composition can comprise an ionizing radiation stabilizing additive. Exemplary ionizing radiation stabilizing additives include certain aliphatic alcohols, aromatic alcohols, aliphatic diols, aliphatic ethers, esters, diketones, alkenes, thiols, thioethers and cyclic thioethers, sulfones, dihydroaromatics, diethers, nitrogen compounds, or a combination comprising at least one of the foregoing. Alcohol-based stabilizing additives may be selected from mono, di-, or polysubstituted alcohols, and can be straight, branched, cyclic and/or aromatic. Useful aliphatic alcohols may include alkenols with sites of unsaturation, examples of which include 4-methyl-4-penten-2-ol, 3-methyl-pentene-3-ol, 2-methyl-4-penten-2-ol, 2,4-dimethyl-4-penten-2-ol, 2-phenyl-4-penten-2-ol, and 9-decen-1-ol; tertiary alcohols including 3-hydroxy-3-methyl-2-butanone, 2-phenyl-2-butanol, and the like; hydroxy-substituted tertiary cycloaliphatics such as 1-hydroxy-1-methyl-cyclohexane; and hydroxymethyl aromatics having an aromatic ring with carbinol substituents such as a methylol group (—CH$_2$OH) or a more complex hydrocarbon group such as (—CRHOH) or (—CR$_2$OH), wherein R is straight chain $C_1$-$C_{20}$ alkyl or branched $C_1$-$C_{20}$ alkyl. Exemplary hydroxy carbinol aromatics include benzhydrol, 2-phenyl-2-butanol, 1,3-benzenedimethanol, benzyl alcohol, 4-benzyloxy-benzyl alcohol, and benzyl-benzyl alcohol.

Useful classes of ionizing radiation stabilizing additives are di- and polyfunctional aliphatic alcohols, also referred to as aliphatic diols and aliphatic polyols. Specifically useful are aliphatic diols of formula (36):

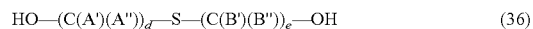

(36)

wherein A', A", B', and B" are each independently H or $C_1$-$C_6$ alkyl; S is $C_1$-$C_{20}$ alkyl, $C_2$-$C_{20}$ alkyleneoxy, $C_3$-$C_6$ cycloalkyl, or $C_3$-$C_6$ substituted cycloalkyl; and d and e are each 0 or 1, provided that, when d and e are each 0, S is selected such that both —OH groups are not connected directly to a single common carbon atom.

In formula (36), A', A", B', and B" can each be independently selected from H, methyl, ethyl, n-propyl, isopropyl, n-butyl, sec-butyl, t-butyl, n-pentyl, 2-pentyl, 3-pentyl, isopentyl, neopentyl, n-hexyl, 2-hexyl, 3-hexyl, 2-methyl pentyl, 3-methylpentyl, 2,2-dimethylbutyl, 2,3-dimethylbutyl, and the like, and a combination comprising at least one of the foregoing alkyl groups.

Spacer group S can be selected from methanediyl, ethanediyl, 1,1-ethanediyl, 1,1-propanediyl, 1,2-propanediyl, 1,3-propanediyl, 2,2-propanediyl, 1,1-butanediyl, 1,2-butanediyl, 1,3-butanediyl, 1,4-butanediyl, 2,2-butanediyl, 2,3-butanediyl, 1,1-pentanediyl, 1,2-pentanediyl, 1,3-pentanediyl, 1,4-pentanediyl, 1,5-pentanediyl, 2,2-pentanediyl, 2,3-pentanediyl, 2,4-pentanediyl, 3,3-pentanediyl, 2-methyl-1,1-butanediyl, 3-methyl-1,1-butanediyl, 2-methyl-1,2-butanediyl, 2-methyl-1,3-butanediyl, 2-methyl-1,4-butanediyl, 2-methyl-2,2-butanediyl, 2-methyl-2,3-butanediyl, 2,2-dimethyl-1,1-propanediyl, 2,2-dimethyl-1,2-propanediyl, 2,2-dimethyl-1,3-propanediyl, 3,3-dimethyl-1,1-propanediyl, 3,3-dimethyl-1,2-propanediyl, 3,3-dimethyl-2,2-propanediyl, 1,1-dimethyl-2,3-propanediyl, 3,3-dimethyl-2,2-propanediyl, 1,1-hexanediyl, 1,2-hexanediyl, 1,3-hexanediyl, 1,4-hexanediyl, 1,5-hexanediyl, 1,6-hexanediyl, 2,2-hexanediyl, 2,3-hexanediyl, 2,4-hexanediyl, 2,5-hexanediyl, 3,3-hexanediyl, 2-methyl-1,1-pentanediyl, 3-methyl-1,1-pentanediyl, 2-methyl-1,2-pentanediyl, 2-methyl-1,3-pentanediyl, 2-methyl-1,4-pentanediyl, 2-methyl-2,2-pentanediyl, 2-methyl-2,3-pentanediyl, 2-methyl-2,4-pentanediyl, 2,2-dimethyl-1,1-butanediyl, 2,2-dimethyl-1,2-butanediyl, 2,2-dimethyl-1,3-butanediyl, 3,3-dimethyl-1,1-butanediyl, 3,3-dimethyl-1,2-butanediyl, 3,3-dimethyl-2,2-butanediyl, 1,1-dimethyl-2,3-butanediyl, 3,3-dimethyl-2,2-butanediyl, and the like; isomers of octanediyl, decanediyl, undecanediyl, dodecanediyl, hexadecanediyl, octadecanediyl, icosananediyl, and docosananediyl; and substituted and unsubstituted cyclopropanediyl, cyclobutanediyl, cyclopentanediyl, cyclohexanediyl, wherein substituents may be the points of attachment, such as in 1,4-dimethylenecyclohexane, or may include branched and straight chain alkyl, cycloalkyl, and the like. Additionally, the spacer group S may be selected from at least one diradical comprising polyalkyleneoxy units, such as ethyleneoxy, 1,2-propyleneoxy, 1,3-propyleneoxy, 1,2-butyleneoxy, 1,4-butyleneoxy, 1,6-hexyleneoxy, and the like; and a combination comprising at least one of the foregoing.

Specific examples of aliphatic diols include ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like;

alicyclic alcohols such as 1,3-cyclobutanediol, 2,2,4,4-tetramethylcyclobutanediol, 1,2-cyclopentanediol, 1,2-cyclohexanediol, 1,3-cyclohexanediol, 1,4-cyclohexanediol, 1,4-dimethylolcyclohexane, and the like; branched acyclic diols such as 2,3-dimethyl-2,3-butanediol(pinacol), and 2-methyl-2,4-pentanediol(hexylene glycol); and polyalkyleneoxy-containing alcohols such as polyethylene glycol, polypropylene glycol, block or random poly(ethylene glycol-co-propylene glycols), and diols of copolymers containing polyalkyleneoxy-groups. Useful polyols may include polyaryleneoxy compounds such as polyhydroxystyrene; alkyl polyols such as polyvinylalcohol, polysaccharides, and esterified polysaccharides. A combination comprising at least one of the foregoing may also be useful. Specifically useful diols include 2-methyl-2,4-pentanediol(hexylene glycol), polyethylene glycol, and polypropylene glycol.

Useful aliphatic ethers may include alkoxy-substituted cyclic or acyclic alkanes such as, for example, 1,2-dialkoxyethanes, 1,2-dialkoxypropanes, 1,3-dialkoxypropanes, alkoxycyclopentanes, alkoxycyclohexanes, and the like. Ester compounds (—COOR) may be useful as stabilizers wherein R may be a substituted or unsubstituted, aromatic or aliphatic, hydrocarbon and the parent carboxy compound may likewise be substituted or unsubstituted, aromatic or aliphatic, and/or mono- or polyfunctional. When present, substituents may include, for example, $C_1$-$C_8$ alkyl, $C_1$-$C_8$ alkyl ether, $C_6$-$C_{20}$ aryl, and the like. Esters which have proven useful include tetrakis(methylene[3,5-di-t-butyl-4-hydroxy-hydrocinnamate])methane, 2,2'-oxamido bis(ethyl-3-(3,5-di-t-butyl-4-hydroxyphenyl)propionate, and trifunctional hindered phenolic ester compounds such as GOODRITE® 3125, available from B.F. Goodrich in Cleveland Ohio.

Diketone compounds may also be used, specifically those having two carbonyl functional groups and separated by a single intervening carbon atoms such as, for example 2,4-pentadione.

Sulfur-containing compounds, useful as stabilizing additives, can include thiols, thioethers and cyclic thioethers. Thiols include, for example, 2-mercaptobenzothiazole; thioethers include dilaurylthiopropionate; and cyclic thioethers include 1,4-dithiane, 1,4,8,11-tetrathiocyclotetradecane. Cyclic thioethers containing more than one thioether group are useful, specifically those having a single intervening carbon between two thioether groups such as in, for example, 1,3-dithiane. The cyclic ring may contain oxygen or nitrogen members.

Aryl or alkyl sulfone stabilizing additives of general structure R—S(O)$_2$—R' may also be used, where R and R' comprise $C_1$-$C_{20}$ alkyl, $C_6$-$C_{20}$ aryl, $C_1$-$C_{20}$ alkoxy, $C_6$-$C_{20}$ aryloxy, substituted derivatives thereof, and the like, and wherein at least one of R or R' is a substituted or unsubstituted benzyl. When present, substituents may include, for example, $C_1$-$C_8$ alkyl, $C_1$-$C_8$ alkyl ether, $C_6$-$C_{20}$ aryl, and the like. An example of a specifically useful sulfone is benzylsulfone.

Alkenes may be used as stabilizing additives. Useful alkenes may include olefins of general structure RR'C=CR"R''' wherein R, R', R", and R''' may each independently be the same or different and may be selected from hydrogen, $C_1$-$C_{20}$ alkyl, $C_1$-$C_{20}$ cycloalkyl, $C_1$-$C_{20}$ alkenyl, $C_1$-$C_{20}$ cycloalkenyl, $C_6$-$C_{20}$ aryl, $C_6$-$C_{20}$ arylalkyl, $C_6$-$C_{20}$ alkylaryl, $C_1$-$C_{20}$ alkoxy, $C_6$-$C_{20}$ aryloxy and substituted derivatives thereof. When present, substituents may include, for example, $C_1$-$C_8$ alkyl, $C_1$-$C_8$ alkyl ether, $C_6$-$C_{20}$ aryl, and the like. The olefins may be acyclic, exocyclic, or endocyclic. Examples of specifically useful alkenes include 1,2-diphenyl ethane, allyl phenol, 2,4-dimethyl-1-pentene, limonene, 2-phenyl-2-pentene, 2,4-dimethyl-1-pentene, 1,4-diphenyl-1,3-butadiene, 2-methyl-1-undecene, 1-dodecene, and the like, or a combination comprising at least one of the foregoing.

Hydroaromatic compounds may also be useful as stabilizing additives, including partially hydrogenated aromatics, and aromatics in combination with an unsaturated ring. Specific aromatics include benzene and/or naphthalene based systems. Examples of useful hydroaromatic compounds include indane; 5,6,7,8-tetrahydro-1-naphthol; 5,6,7,8-tetrahydro-2-naphthol; 9,10-dihydro anthracene; 9,10-dihydrophenanthrene; 1-phenyl-1-cyclohexane; 1,2,3,4-tetrahydro-1-naphthol; and the like; or a combination comprising at least one of the foregoing.

Diethers, including hydrogenated and non-hydrogenated, and substituted and unsubstituted pyrans, may also be used as stabilizing additives. When present, substituents may include $C_1$-$C_8$ alkyl, $C_1$-$C_8$ alkyl ether, or $C_6$-$C_{20}$ aryl. The pyrans may have substituents including $C_1$-$C_{20}$ alkyl, $C_6$-$C_{20}$ aryl, $C_1$-$C_{20}$ alkoxy, or $C_6$-$C_{20}$ aryloxy, and which may be positioned on any carbon of the pyran ring. Specifically useful substituent groups include $C_1$-$C_{20}$ alkoxy or $C_6$-$C_{20}$ aryloxy, located on the ring at the six position. Hydrogenated pyrans are specifically useful. Examples of diethers include dihydropyranyl ethers and tetrahydropyranyl ethers.

Nitrogen compounds that may function as stabilizers include high molecular weight oxamide phenolics, for example, 2,2-oxamido bis-[ethyl 3-(3,5-di-tert-butyl-4-hydroxyphenyl)propionate], high molecular weight oxalic anilides and their derivatives, and amine compounds such as thiourea.

Ionizing radiation stabilizing additives are typically used in amounts of 0.001 to 1 parts by weight, based on 100 parts of the combined weight of alkyl-substituted polycarbonate, polyester-polycarbonate, and any additional polymer.

The thermoplastic composition may include fillers or reinforcing agents. The fillers and reinforcing agents may desirably be in the form of nanoparticles, i.e., particles with a median particle size ($D_{50}$) smaller than 100 nm as determined using light scattering methods. Where used, fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silica powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (atmospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

Useful fillers contemplated herein are visual effects fillers that possess compositional, shape and dimensional qualities suitable to the reflection and/or refraction of light. Visual effect fillers include those having planar facets and can be multifaceted or in the form of flakes, shards, plates, leaves, wafers, and the like. The shape can be irregular or regular. A non-limiting example of a regular shape is a hexagonal plate. Specifically useful visual effect fillers are two dimensional, plate-type fillers, wherein a particle of a plate type filler has a ratio of its largest dimension to smallest dimension of greater than or equal to 3:1, specifically greater than or equal to 5:1, and more specifically greater than or equal to 10:1. The largest dimension so defined can also be referred to as the diameter of the particle. Plate-type fillers have a distribution of particle diameters described by a minimum and a maximum particle diameter. The minimum particle diameter is described by the lower detection limit of the method used to determine particle diameter, and corresponds to it. A typical method of determining particle diameters is laser light scattering, which can for example have a lower detection limit for particle diameter of 0.6 nanometers. It should be noted that particles having a diameter less than the lower detection limit may be present but not observable by the method. The maximum particle diameter is typically less than the upper detection limit of the method. The maximum particle diameter herein may be less than or equal to 1,000 micrometers, specifically less than or equal to 750 micrometers, and more specifically less than or equal to 500 micrometers. The distribution of particle diameters can be unimodal, bimodal, or multimodal. The diameter can be described more generally using the mean of the distribution of the particle diameters, also referred to as the mean diameter. Specifically, particles disclosed herein have a mean diameter of 1 to 100 micrometers, specifically 5 to 75 micrometers, and more specifically 10 to 60 micrometers. Specific reflective fillers are further of a composition having an optically dense surface exterior finish useful for reflecting incident light. Metallic and non-metallic fillers such as those based on aluminum, silver, copper, bronze, steel, brass, gold, tin, silicon, alloys of these, combinations comprising at least one of the foregoing metals, and the like, are specifically useful. Also specifically useful are inorganic fillers prepared from a composition presenting a surface that is useful for reflecting and/or refracting incident light. In contrast to a reflective filler, a refractive filler having refractive properties can be at least partially transparent, i.e., can allow transmission of a percentage of incident light, and can provide optical properties based on reflection, refraction, or a combination of reflection and refraction of incident light. Inorganic fillers having light reflecting and/or refracting properties can include micas, alumina, lamellar talc, silica, silicon carbide, glass, combinations comprising at least one of the foregoing inorganic fillers, and the like.

The fillers and reinforcing agents may be coated with a layer of metallic material to facilitate conductivity, or surface treated with silanes to improve adhesion and dispersion with the thermoplastic composition matrix. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Exemplary cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers can be used in amounts of 0 to 90 parts by weight, based on 100 parts of the combined weight of alkyl-substituted polycarbonate, polyester-polycarbonate, and any additional polymer.

The thermoplastic composition may also include antioxidant additives such as, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionate acid or the like; or combinations comprising at least one of the foregoing antioxidants. An exemplary antioxidant is SANDOSTAB® P-EPQ phosphite stabilizer, commercially available from Clariant. Antioxidants can be used in amounts of 0.0001 to 1 parts by weight, based on 100 parts of the combined weight of alkyl-substituted polycarbonate, polyester-polycarbonate, and any additional polymer.

Exemplary heat stabilizer additives include organophosphites such as triphenyl phosphite, tris-(2,6-dimethylphenyl) phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 parts by weight, based on 100 parts of the combined weight of alkyl-substituted polycarbonate, polyester-polycarbonate, and any additional polymer.

Light stabilizers and/or ultraviolet light (UV) absorbing additives may also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers can be used in amounts of 0.0001 to 1 parts by weight, based on 100 parts of the combined weight of alkyl-substituted polycarbonate, polyester-polycarbonate, and any additional polymer.

The thermoplastic composition may also include an ultraviolet (UV) absorbing additive, also referred to as a UV absorber. Exemplary compounds for use as UV absorbing additives include hydroxybenzophenones; hydroxybenzotriazoles; hydroxybenzotriazines; cyanoacrylates; oxanilides; benzoxazinones; or a combination comprising at least one of the foregoing. Specifically useful commercially available UV absorbers include TINUVIN® 234, TINUVIN® 329, TINUVIN® 350, and TINUVIN® 360, commercially available from Ciba Specialty Chemicals; 2-(2H-benzotriazol-2-yl)-4-(1,1,3,3-tetramethylbutyl)-phenol (CYASORB® 5411), 2-hydroxy-4-n-octyloxybenzophenone (CYASORB® 531), 2-[4,6-bis(2,4-dimethylphenyl)-1,3,5-triazin-2-yl]-5-(octyloxy)-phenol (CYASORB® 1164), 2,2'-(1,4-phenylene)-bis-(4H-3,1-benzoxazin-4-one) (CYASORB® UV-3638), CYASORB® UV absorbers, available from Cyanamide; and 2,2'-(1,4-phenylene)bis(4H-3,1-benzoxazin-4-one), 1,3-bis[(2-cyano-3,3-diphenylacryloyl)oxy]-2,2-bis[[(2-cyano-3,3-diphenylacryloyl) oxy]methyl]propane, and 1,3-bis[(2-cyano-3,3-diphenylacryloyl)oxy]-2,2-bis[[(2-cyano-3,3-diphenylacryloyl)oxy]methyl]propane (UVINUL® 3030), commercially available from BASF. In addition, UV absorbers may include nano-size inorganic materials such as titanium oxide, cerium oxide, zinc oxide, or the like, all with particle size less than 100 nanometers, may be used. Combinations comprising at least one of the foregoing UV absorbers may be used. UV absorbers can be used in amounts of 0.0001 to 1 parts by weight, based on 100 parts of the combined weight of alkyl-substituted polycarbonate, polyester-polycarbonate, and any additional polymer.

Plasticizers, lubricants, and/or mold release agents may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; combinations of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.001 to 1 parts by weight, based on 100 parts of the combined weight of alkyl-substituted polycarbonate, polyester-polycarbonate, and any additional polymer.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat® 6321 available from Sanyo, Pebax® MH1657 available from Atofina, or Irgastat® P18 and P22 both available from Ciba-Geigy. Other polymeric materials that may be used as antistatic agents are inherently conducting polymers such as polyaniline (commercially available as PANIPOL® EB from Panipol), polypyrrole and polythiophene (commercially available from Bayer), which retain some of their intrinsic conductivity after melt processing at elevated temperatures. In an embodiment, carbon fibers, carbon nanofibers, carbon nanotubes, carbon black, or any combination of the foregoing may be used in a polymeric resin containing chemical antistatic agents to render the composition electrostatically dissipative. Antistatic agents can be used in amounts of 0.0001 to 5 parts by weight, based on 100 parts of the combined weight of alkyl-substituted polycarbonate, polyester-polycarbonate, and any additional polymer.

Exemplary flame retardants can be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups may be joined together to provide a cyclic group, for example, diphenyl pentaerythritol diphosphate. Other aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

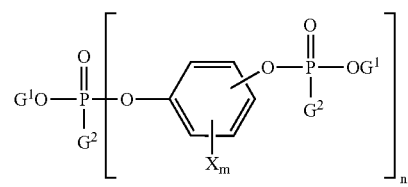

-continued

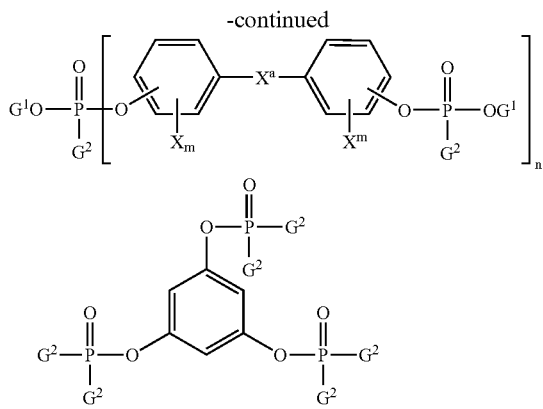

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms; each X is independently a bromine or chlorine; m is 0 to 4, and n is 1 to 30. Examples of di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants can be present in amounts of 0.1 to 10 parts by weight, based on 100 parts of the combined weight of alkyl-substituted polycarbonate, polyester-polycarbonate, and any additional polymer.

Halogenated materials may also be used as flame retardants, for example halogenated compounds and resins of formula (37):

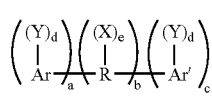 (37)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (37) are each independently mono- or polycarbocyclic aromatic groups such as phenylene, biphenylene, terphenylene, naphthylene, or the like.

Y is an organic, inorganic, or organometallic group, for example: halogen, e.g., chlorine, bromine, iodine, fluorine; ether groups of the general formula OX', wherein X' is a monovalent hydrocarbon group similar to X; monovalent hydrocarbon groups of the type represented by R; or other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and arylalkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenylmethane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen-containing flame retardants can be present in amounts of 0.1 to 10 parts by weight, based on 100 parts of the combined weight of alkyl-substituted polycarbonate, polyester-polycarbonate, and any additional polymer.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts can be present in amounts of 0.1 to 5 parts by weight, based on 100 parts of the combined weight of alkyl-substituted polycarbonate, polyester-polycarbonate, and any additional polymer.

Anti-drip agents may also be used, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. An exemplary TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents can be used in amounts of 0.1 to 5 parts by weight, based on 100 parts of the combined weight of alkyl-substituted polycarbonate, polyester-polycarbonate, and any additional polymer.

Thus, in an embodiment, the thermoplastic composition may further comprise an additive including a filler, an ionizing radiation stabilizer, an antioxidant, a heat stabilizer, a light stabilizer, an ultraviolet light absorber, a plasticizer, a lubricant, a mold release agent, an antistatic agent, a pigment, a dye, a flame retardant, an anti-drip agent, or a combination comprising at least one of the foregoing additives.

In an embodiment, the thermoplastic composition (or articles prepared therefrom) may exhibit at least one of the following desirable properties: a percent haze of less than or equal to 10%, more specifically less than or equal to 5%, and more specifically less than or equal to 3%, when measured at a thickness of 3.2±0.12 mm according to ASTM D1003-00; a melt volume ratio (MVR) of 2 to 25, more specifically 4 to 10 $cm^3$/10 minutes, measured at 300° C. under a load of 1.2 kg in accordance with ISO 1133; a heat deformation temperature (HDT) of 110 to 170° C. when measured at 0.455 megaPascals (MPa) according to ISO 179; or a Notched Izod Impact (NII) strength of 600 to 1,000 Joules per meter (J/m), when measured according to ASTM D256-04 at 23° C. The thermoplastic composition may further have a % tensile elongation of 30 to 120%, when measured in accordance with ASTM D256-04.

The thermoplastic composition may be manufactured by methods generally available in the art, for example, In an embodiment, in one manner of proceeding, powdered alkyl-substituted polycarbonate, polyester-polycarbonate, any additional polymer, and other additives are first blended, in a HENSCHEL-Mixer® high speed mixer. Other low shear processes including but not limited to hand mixing may also accomplish this blending. The blend is then fed into the throat of an extruder via a hopper. Alternatively, at least one of the components may be incorporated into the composition by feeding directly into the extruder at the throat and/or downstream through a sidestuffer. Where desired, the alkyl-substituted polycarbonate, polyester-polycarbonate, and any desired additional resin and/or additives may also be compounded into a masterbatch and combined with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic composition comprises melt combining a alkyl-substituted polycarbonate, polyester-polycarbonate, and an additive. The melt combining can be done by extrusion. In an embodiment, the proportions of alkyl-substituted polycarbonate, polyester-polycarbonate, any added polymer, and additive, are selected such that the gloss retention of the thermoplastic composition are maximized while scratch resistance is at a desirable level.

In a specific embodiment, the extruder is a twin-screw extruder. The extruder is typically operated at a temperature of 180 to 385° C., specifically 200 to 330° C., more specifically 220 to 300° C., wherein the die temperature may be different. The extruded thermoplastic composition is quenched in water and pelletized.

In some embodiments, thermoplastic compositions comprising the alkyl-substituted polycarbonate, polyester-polycarbonate, and any additional polymer are useful in the production of opaque, translucent, or transparent articles. For example, the article may comprise a film, sheet, molded object, membrane, or composite, wherein the film, sheet, molded object, or composite has at least one layer comprising the composition. Compositions of the invention may be made into articles using common thermoplastic processes such as film and sheet extrusion, injection molding, gas-assist injection molding, extrusion molding, compression molding, blow molding, and the like. Film and sheet extrusion processes may include melt casting, blown film extrusion, and calendaring. Co-extrusion and lamination processes may be employed to form composite multi-layer films or sheets. Single or multiple layers of coatings may further be applied to the single or multi-layer substrates to impart additional properties such as scratch resistance, ultraviolet light resistance, aesthetic appeal, lubricity, and biocompatibility. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt, or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as follows: (a.) Providing a single or multi-layer thermoplastic substrate having optionally at least one colors on the surface, for instance, using screen printing or a transfer dye; (b.) Conforming the substrate to a mold configuration such as by forming and trimming a substrate into a three dimensional shape and fitting the substrate into a mold having a surface which matches the three dimensional shape of the substrate; (c.) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including but not limited to heat-setting, texturing, embossing, corona treatment, flame treatment, plasma treatment and vacuum deposition may further be applied to the above articles to alter surface appearances and impart additional functionalities to the articles.

Shaped, formed, or molded articles comprising the thermoplastic compositions are also provided. The thermoplastic compositions may be molded into useful shaped articles by a variety of methods such as injection molding, extrusion, rotational molding, blow molding and thermoforming. Articles prepared from these resins include injection-molded parts such as lens covers, dishware, medical applications, garden equipment, sports and leisure articles, and the like; and thermoformed and non-thermoformed articles prepared from sheets of thermoplastic such as protective sheets, films, automotive panels, and the like. Additional fabrication operations may be performed on articles, such as, but not limited to molding, in-mold decoration, baking in a paint oven, lamination, and/or thermoforming.

The thermoplastic composition is further illustrated by the following non-limiting examples.

The compositions were prepared by compounding on a Werner and Pfleider 25 mm intermeshing twin screw extruder at 300 rpm with barrel temperatures 40-200-250-285-300-300-300-300° C. The plaques used for this study were molded on an Engel 75T molding apparatus having 4 temperature zones set at 280-290-300-295° C. (mold temperature 90° C.).

Molecular weight was determined by gel permeation chromatography using a crosslinked styrene-divinyl benzene-packed column with an ultraviolet (UV) detector operating at 254 nm, a sample concentration of 1.0 mg/ml, and as calibrated against polycarbonate standards.

Scratch resistance was evaluated according to the Erichson Scratch Test (which is similar to the standard surface hardness scratch test method described in ISO 1518:2001) by dragging a stylus pin, held at a 90 degree angle to the test surface and under a constant load of 6 Newtons downward force, over the surface of a series of test articles, with each test article consisting of one of each of Comparative Examples 1-4 and Examples 1-3. The depth (in micrometers) of the resulting scratches produced on the material surface is measured with a profilometer The hardness of the plastic surface is also determined more simply using the test method according to ASTM D3363-92a, which describes a procedure for rapid, inexpensive determination of the film hardness of an organic coating on a substrate in terms of drawing leads or pencil leads of known hardness ranging in order of softest to hardest: 6B, 5B, 4B, 3B, 2B, B, HB, F, H, 2H, 3H, 4H, 5H, 6H. In the method, a coated panel (or other test substrate) is placed on a firm horizontal surface. The pencil is held firmly against the film at a 45 degree angle (with the point directed away from the operator) and pushed away from the operator in a single stroke of 6.5 mm in length. The process is started with the hardest pencil and continued down the scale of hardness to either of two end points; one, the pencil that will not cut into or gouge the film (pencil hardness), or two, the pencil that will not scratch the film (scratch hardness). Higher pencil hardness and shallower scratches (lower scratch depths) indicate better scratch resistance.

Thermoplastic compositions for the examples and comparative examples were prepared using the components shown in Table 1.

TABLE 1

| Component | Description | Source |
| --- | --- | --- |
| DMBPC-PC | Poly(50 mol %-(1,1-bis(4-hydroxy-3-methylphenyl)cyclohexane carbonate)-co-(50 mol % bisphenol-A carbonate) copolymer, (Mw = 23,000 g/mol, PC standards) | GE Plastics |
| BPA-PC | Polycarbonate resin (Mw = 25,000 g/mol, PC standards) | GE Plastics |
| 20:80 ITR-PC | Poly(20 mol % isophthalate-terephthalate-resorcinol ester)-co-(80 mol % bisphenol-A carbonate) copolymer (Mw = 25,000 g/mol, PC standards) | GE Plastics |
| 40:60 ITR-PC | Poly(40 mol % isophthalate-terephthalate-resorcinol ester)-co-(60 mol % bisphenol-A carbonate) copolymer (Mw = 25,000 g/mol, PC standards) | GE Plastics |

Surface gloss was tested according to ASTM D2457-03 at 60° using a Garden Gloss Meter calibrated using a standard black glass chip with a gloss of 100 gloss units (GU), and measured using 3 millimeter±0.12 millimeter thick color chips both before and after weathering with a xenon arc lamp for 500 hours according to ISO 4892-2A. The gloss retention (%) is determined by dividing the gloss value (in GU) for a weathered sample (e.g., molded article) by the measured gloss value in GU of a non-weathered sample (e.g., molded article) of the same composition, and multiplying the result by 100%.

Comparative Examples 1-4 and Examples 1-3

Comparative Examples 1-4 were prepared by extruding and molding compositions including DMBPC-PC, 20:80 ITR-PC, 40:60 ITR-PC, or BPA-PC. Examples 1-3 were prepared by melt blending combinations of the DMBPC-PC, 20:80 ITR-PC, 40:60 ITR-PC, and/or BPA-PC. The weight ratios of these polymers, as used in the examples and comparative examples, along with the resulting data for gloss retention, pencil hardness, and scratch depth are shown in Table 2, below.

TABLE 2

|  | CEx 1 | CEx 2 | CEx 3 | CEx 4 | Ex 1 | Ex 2 | Ex 3 |
|---|---|---|---|---|---|---|---|
| DMBPC-PC[a] | 100 | — | — | — | 50 | 50 | 50 |
| BPA-PC[a] | — | 100 | — | — | — | 25 | — |
| 20:80 ITR-PC[a] | — | — | 100 | — | 50 | — | — |
| 40:60 ITR-PC[a] | — | — | — | 100 | — | 25 | 50 |
| DMBPC (mol %) | 50 | 0 | — | — | 23 | 23 | 23 |
| ITR Estern (mol %) | — | 0 | 20 | 40 | 11 | 9 | 18 |
| Gloss Retention (GR; %) | 11.4 | 92.6 | 79 | 86.6 | 66.8 | 68.7 | 74.7 |
| Expected GR (EGR; %) | — | — | — | — | 45.2 | 50.5 | 49 |
| Difference (GR − EGR = dGR) | — | — | — | — | 21.6 | 18.2 | 25.7 |
| Pencil Hardness | H | 3B | 2B | B | HB | F | F |
| Scratch Depth at 6 N (□m) | 14 | 26 | 22 | 19 | 18 | 17 | 17 |
| Expected Scratch Depth at 6 N (□m) | — | — | — | — | 18 | 18.25 | 16.5 |

[a]Amounts of polymers are given in parts by weight (pbw).

In all blends of DMBPC-PC with ITR-PC, the values for gloss retention are higher than would be expected based on a calculated value for gloss retention. The expected values for gloss retention are calculated semi-empirically based on the gloss retentions of each of the polymeric components blended together to form the thermoplastic composition.

In Table 2, for Example 1 the measured gloss retention is 66.8%, whereas the calculated gloss retention value based on the linear weight combination of gloss retention values for DMBPC-PC and ITR-PC (in this case, 20:80 ITR-PC) is as follows:

$$\begin{aligned}EGR \text{ for } Ex\ 1 &= [(\text{wt \% of } DMBPC\text{-}PC/100 \text{ wt \%}) \times \\ &\quad (\text{gloss retention of } DMBPC\text{-}PC)] + \\ &\quad [(\text{wt \% of } ITR\text{-}PC/100 \text{ wt \%}) \times \\ &\quad (\text{gloss retention of } ITR\text{-}PC)] + \\ &\quad [(\text{wt \% of } BPA\text{-}PC) \times \\ &\quad (\text{gloss retention of } BPA\text{-}PC)] \\ &= [(50 \text{ wt \%}/100 \text{ wt \%}) \times 11.4\%] + \\ &\quad [(50 \text{ wt \%}/100 \text{ wt \%}) \times 79\%] + 0 \\ &= [5.7\%] + [39.5\%] \\ &= 45.2\%\end{aligned}$$

By the above calculation, the expected (calculated) gloss retention for Example 1 is 45.2%, for an overall unexpected increase of 21.2% gloss retention for a 50:50 weight ratio blend of DMBPC-PC with 20:80 ITR-PC. Similarly, for Example 2 the measured gloss retention of 68.7% is 18.2% higher than the calculated gloss retention value of 50.5%, and for Example 3, the measured gloss retention of 74.7% is 25.7% higher than the calculated gloss retention value of 49%. Thus, the combination of arylate ester units (e.g., ITR ester units) and methyl-substituted cyclohexylidene-bridged carbonate units (e.g., DMBPC carbonate units), provide a synergistic improvement in gloss retention for the combination of these ester and carbonate units.

In addition, the scratch test performance of the combination of the DMBPC-PC and ITR-PC polymers is improved by the presence of the alkyl-substituted carbonate units of the DMBPC-PC polymer. The pencil hardness scratch test shows a hardness for each of Examples 1-3 of HB or harder. In addition, the Erikson scratch test performance for each of Examples 1-3 is less than 19 (□m), whereas Comparative Examples 2-4 each have a scratch performance of 19 (□m) or greater. In the comparative examples, the best scratch performance with a depth of 14 (□m) is seen in Comparative Example 1 (DMBPC-PC, with 50 mol % DMBPC carbonate units), but which also has the lowest gloss retention at 11.4%; whereas the least robust scratch performance of 26 (□m) is seen in Comparative Example 2, which also has the highest gloss retention at 92.6%. From the above data, it can be seen that the greatest improvement in gloss retention with simultaneous desirable scratch test performance is obtained at greater than or equal to 20 mol % ITR ester and greater than or equal to 25 mol % of DMBPC (Example 3).

Figure 2:
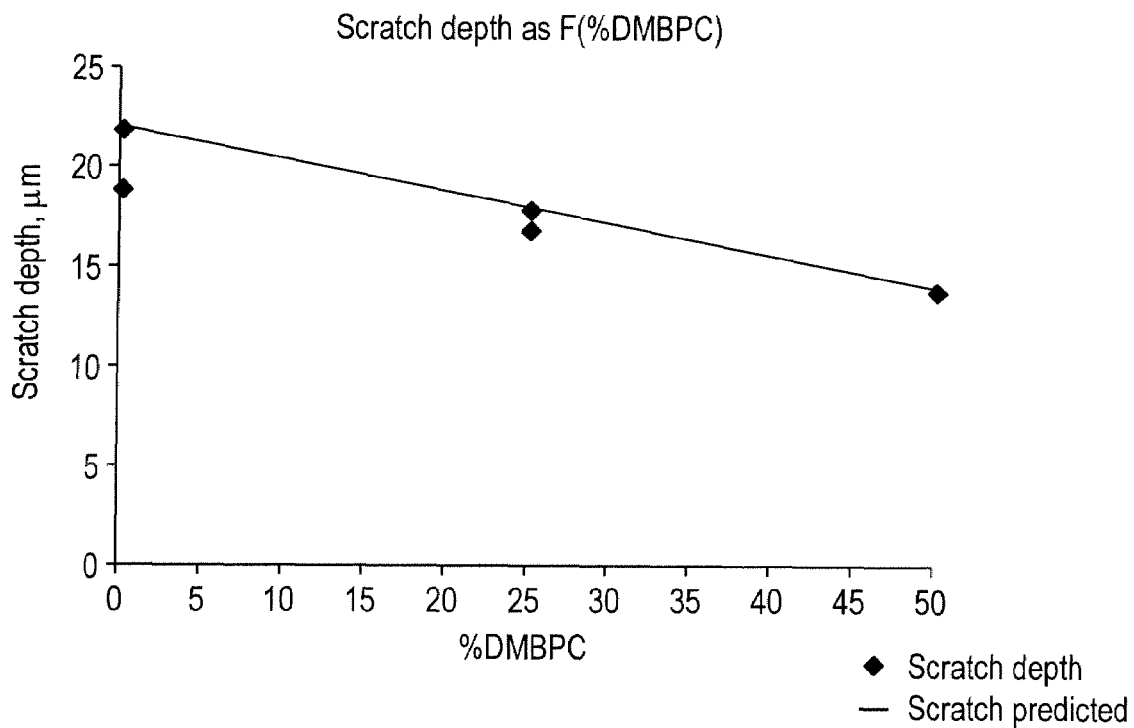
FIG. 2 is a plot of scratch test performance (scratch depth) versus percent DMBPC carbonate for the thermoplastic composition of the examples and comparative examples.

FIGS. 1 and 2. FIG. 1 shows a plot of gloss retention versus mole percent (mol %) ITR ester for the blended thermoplastic compositions, plotted against a line corresponding to the expected gloss retention value for a particular ITR ester loading. It can be seen that the data points corresponding to Examples 1-3 are greater than that expected for the linear increase in gloss retention predicted by a straight line from 0 mol % ester (Comparative Example 1) to 40 mol % ester (Comparative Example 4). It can be seen in the graph that addition of relatively small amounts of ester (about 5 mol % or greater) lead to very good gloss retention.

FIG. 2 shows a plot of the values for the Erikson scratch test versus mol % DMBPC loading, in which the solid line corresponds to the predicted value based on the maximum ester loading/minimum DMBPC loading (CEx. 4) and the minimum ester loading/maximum DMBPC loading (CEx. 1). The plot shows that when the amount of ester is increased in combination with the amount of DMBPC, the scratch resistance is also improved.

Compounds are described herein using standard nomenclature. A dash ("-") that is not between two letters or symbols is used to indicate a point of attachment for a substituent. For example, —CHO is attached through the carbon of the carbonyl (C=O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another. The notation "±0.12 mm" means that the indicated measurement can be from an amount that is 0.12 mm lower to an amount that is 0.12 mm higher than the stated value.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

We claim:

1. A thermoplastic composition comprising:
   A) 25 to 95 parts by weight of a first polycarbonate consisting essentially of:

a polycarbonate having the formula:

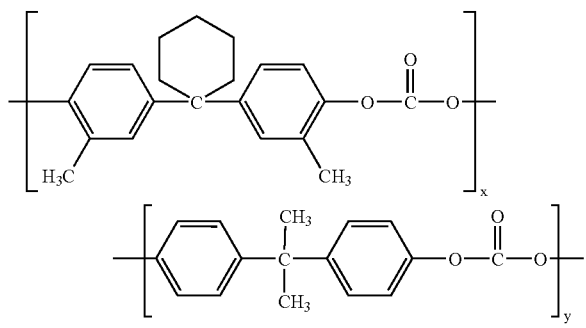

wherein the molar ratio of x to y is 25:75 to 100:0;
B) 5 to 75 parts by weight of a polyester-polycarbonate having the formula

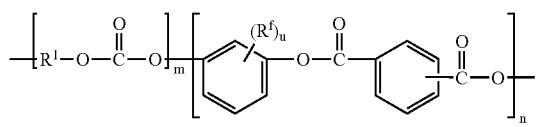

wherein $R^1$ is a $C_{6-30}$ aromatic group, each $R^f$ is independently $C_{1-12}$ alkyl, or halogen, u is 0 to 4, and the molar ratio of m to n is 95:5 to 10:90, and
C) 0 to 65 parts by weight of a second polycarbonate,
wherein the first polycarbonate and second polycarbonate are not identical, and the sum of the parts by weight of the first polycarbonate, the polyester-polycarbonate, and the second polycarbonate is 100 parts by weight.

2. The thermoplastic composition of claim 1, wherein the polyester-polycarbonate consists essentially of the formula:

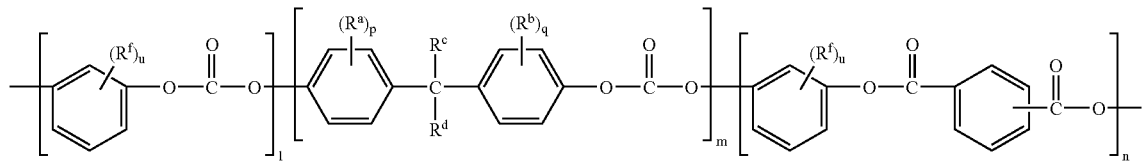

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, p, q, and u are independently 0 to 4, l is 0 to 30 mol %, m is 10 to 95 mol %, and n is 5 to 90 mol %, and the sum of l, m, and n is 100 mol %.

3. The thermoplastic composition of claim 2, wherein the polyester-polycarbonate consists essentially of the formula:

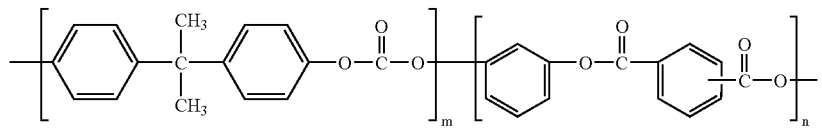

wherein the molar ratio of m to n is 95:5 to 10:90.

4. The thermoplastic composition of claim 1, wherein the first carbonate unit is present in the first polycarbonate in an amount of 50 to 85 mol %, and the second carbonate unit is present in the first polycarbonate in an amount of 15 to 50 mol %.

5. The thermoplastic composition of claim 1, wherein the second polycarbonate comprises carbonate units of the formula:

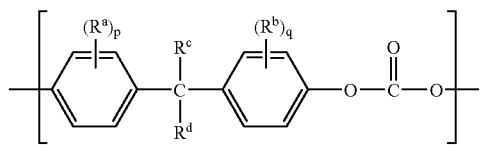

wherein $R^a$ and $R^b$ are each independently $C_{1-12}$ alkyl, or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; and p and q are each independently 0 to 4.

6. The thermoplastic composition of claim 1, wherein the thermoplastic composition has a molar amount of arylate ester of greater than or equal to 10 mol %, and a molar amount of alkyl-substituted bisphenol carbonate of greater than or equal to 25 mol %.

7. The thermoplastic composition of claim 1, wherein a molded article consisting of the thermoplastic composition has, after xenon arc lamp weathering for 500 hours according to ISO 4892-2A, a gloss retention of greater than 50% as measured at an angle of 60 degrees and calibrated using a black glass standard of 100 GU according to ASTM D2457-03.

8. The thermoplastic composition of claim 1, wherein a molded article consisting of the thermoplastic composition has a scratch depth measured at an angle of 90 degrees of less than or equal to 19 micrometers, measured at 6 Newtons downward force.

9. The thermoplastic composition of claim 1, wherein a molded article consisting of the thermoplastic composition has a pencil scratch hardness of HB or harder according to ASTM D3363-92a.

10. The thermoplastic composition of claim 1, further comprising an additive including a filler, an ionizing radiation stabilizer, an antioxidant, a heat stabilizer, a light stabilizer, an ultraviolet light absorber, a plasticizer, a lubricant, a mold release agent, an antistatic agent, a pigment, a dye, a flame retardant, an anti-drip agent, or a combination comprising at least one of the foregoing additives, wherein the type and amount of additive is selected such that the desired properties of the thermoplastic composition are not substantially adversely affected.

11. The thermoplastic composition of claim 10 wherein the thermoplastic composition comprises a black colorant.

12. An article comprising the thermoplastic composition of claim 1.

13. A thermoplastic composition consisting essentially of:

A) 25 to 95 parts by weight of a first polycarbonate consisting essentially of:

a polycarbonate having the formula:

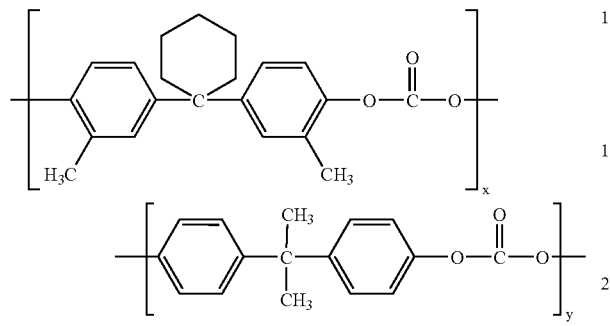

wherein the molar ratio of x to y is 25:75 to 100:0;

B) 5 to 75 parts by weight of a polyester-polycarbonate having the formula:

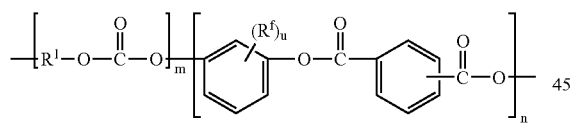

wherein $R^1$ is a $C_{6-30}$ aromatic group, each $R^f$ is independently $C_{1-12}$ alkyl, or halogen, u is 0 to 4, and the molar ratio of m to n is 95:5 to 10:90, C) 0 to 65 parts by weight of a second polycarbonate, and D) an additive, wherein the first polycarbonate and second polycarbonate are not identical, and the sum of the parts by weight of the first polycarbonate, the polyester-polycarbonate, and the second polycarbonate is 100 parts by weight.

14. A thermoplastic composition comprising:

A) 25 to 95 parts by weight of a first polycarbonate comprising the formula:

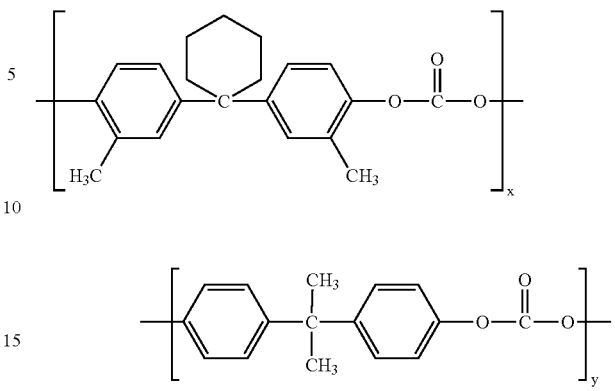

wherein the molar ratio of x to y is 25:75 to 100:0, and

B) 5 to 75 parts by weight of a polyester-polycarbonate comprising the formula

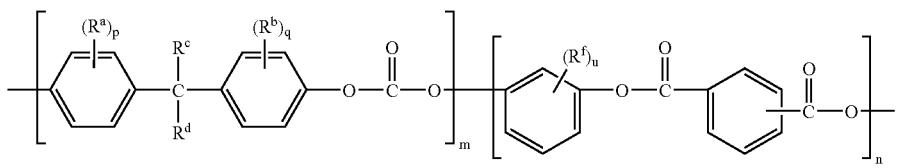

wherein $R^a$, $R^b$, and $R^f$ are each independently $C_{1-12}$ alkyl or halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; p, q, and u are independently 0 to 4, and the molar ratio of m to n is 95:5 to 10:90, and C) 0 to 65 parts by weight of a second polycarbonate, wherein the first polycarbonate and second polycarbonate are not identical, and the sum of the parts by weight of the first polycarbonate, the polyester-polycarbonate, and the second polycarbonate is 100 parts by weight.

15. The thermoplastic composition of claim 14, wherein a molded article consisting of the thermoplastic composition has, after xenon arc lamp weathering for 500 hours according to ISO 4892-2A, a gloss retention of greater than 50% as measured at an angle of 60 degrees and calibrated using a black glass standard of 100 GU according to ASTM D2457-03.

16. The thermoplastic composition of claim 14, wherein a molded article consisting of the thermoplastic composition has a scratch depth measured at an angle of 90 degrees of less than or equal to 19 micrometers, measured at 6 Newtons downward force.

17. The thermoplastic composition of claim 14, wherein a molded article consisting of the thermoplastic composition has a pencil scratch hardness of HB or harder according to ASTM D3363-92a.

18. An article comprising the thermoplastic composition of claim 13.

* * * * *